(12) United States Patent
Kanomata et al.

(10) Patent No.: US 8,863,578 B2
(45) Date of Patent: Oct. 21, 2014

(54) VERY-SMALL-CAPACITY PRESSURE GAUGE

(75) Inventors: Takeshi Kanomata, Hachioji (JP); Hiroaki Yamura, Hachioji (JP)

(73) Assignee: JASCO Corporation, Hachioji-shi, Tokyo (JP)

( * ) Notice: Subject to any disclaimer, the term of this patent is extended or adjusted under 35 U.S.C. 154(b) by 504 days.

(21) Appl. No.: 13/248,061

(22) Filed: Sep. 29, 2011

(65) Prior Publication Data

US 2012/0082569 A1 Apr. 5, 2012

(30) Foreign Application Priority Data

Oct. 1, 2010 (JP) ................................. 2010-223802

(51) Int. Cl.
*G01L 7/00* (2006.01)
*G01L 9/00* (2006.01)
(52) U.S. Cl.
CPC .................................... *G01L 9/0002* (2013.01)
USPC .................................. 73/700; 73/726; 73/753
(58) Field of Classification Search
None
See application file for complete search history.

(56) References Cited

U.S. PATENT DOCUMENTS

| | | | |
|---|---|---|---|
| 4,420,980 A * | 12/1983 | Dunemann et al. ............. | 73/730 |
| 4,984,602 A | 1/1991 | Saito et al. | |
| 5,360,320 A | 11/1994 | Jameson et al. | |
| 5,495,769 A * | 3/1996 | Broden et al. .................. | 73/718 |
| 5,499,535 A * | 3/1996 | Amano et al. .................. | 73/717 |
| 5,505,092 A | 4/1996 | Kowalski | |
| 6,474,170 B1 * | 11/2002 | Yamagishi et al. ............. | 73/723 |
| 6,997,058 B2 * | 2/2006 | Toyoda ............................ | 73/726 |
| 7,150,198 B2 * | 12/2006 | Kaneko et al. .................. | 73/756 |
| 7,891,254 B2 * | 2/2011 | Edwards et al. ................ | 73/856 |
| 7,954,994 B2 * | 6/2011 | Warth et al. .................... | 374/143 |

FOREIGN PATENT DOCUMENTS

| | | |
|---|---|---|
| EP | 1411336 A1 | 4/2004 |
| JP | 61-70768 U | 5/1986 |
| JP | 05-149813 | 6/1993 |
| JP | 8-30989 | 3/1996 |
| JP | 10-132676 | 5/1998 |
| JP | 2002-174628 | 6/2002 |
| JP | 2002-228533 | 8/2002 |

OTHER PUBLICATIONS

Brief Description of Relevance and Partial English Translation of JP 61-70768 U, 1 page.

(Continued)

*Primary Examiner* — Lisa Caputo
*Assistant Examiner* — Jermaine Jenkins
(74) *Attorney, Agent, or Firm* — Rankin, Hill & Clark LLP

(57) ABSTRACT

A pressure gauge mounted to a pump or a back pressure regulator in an HPLC, SFC, or SFE system provides improved solvent exchange and improved measurement precision. A through hole having an inside diameter of 1.0 mm is made in a hexagonal member similar in shape to a pipe joint. A part of the hexagonal member is cut away to form a flat surface such that the distance to the outside periphery of the through hole is 0.5 mm to serve as a strain-measurement strain gauge attaching surface. One strain gauge is attached to the center of the strain-measurement strain gauge attaching surface, and two strain gauges are attached for temperature correction, one on the same surface as the strain-measurement strain gauge attaching surface and the other on an outside surface of the hexagonal member.

21 Claims, 24 Drawing Sheets

(56) References Cited

OTHER PUBLICATIONS

Patent Abstracts of Japan, Publication No. 05-149813, 22 pages.
Patent Abstracts of Japan, Publication No. 2002-228533, 20 pages.
European Search Report, dated Feb. 3, 2012, Jasco Corporation, App. No. 11183644.1, five pages.
Japanene Patent Abstract for Publication No. 10-132676 published May 22, 1998, five pages.

* cited by examiner bridge circuit

VERY-SMALL-CAPACITY PRESSURE GAUGE

FIELD OF THE INVENTION

The present invention relates to very-small-capacity pressure gauges provided in a flow path and having improved solvent exchange.

DESCRIPTION OF THE RELATED ART

A high-performance liquid chromatograph is formed of pumps for supplying the mobile phase, an automatic sampler for injecting a sample, a column for separating the sample, and a detector for detecting the sample. When the sample injected by the automatic sampler passes through a stationary phase together with the mobile phase supplied from the pumps, the two phases react with each other in the column. The components of the sample are separated and refined by using differences in distribution coefficients or differences in the adsorption power between the surface of the stationary phase and the sample.

By changing the composition of the mobile phase, the elution time of the sample can be changed. One method of performing such an operation to elute the sample is generally called gradient elution. For example, if the composition of water and methanol is changed within set time, when the composition of methanol is reduced, a more polar substance is eluted; and then, when the composition of methanol is gradually increased, a less polar substance is eluted.

Gradient elution is divided into two types according to the way the solvent is supplied from the pump. One type is called a high-pressure gradient method, in which a plurality of pumps are provided, each filled with a solvent, and the pumps supply the solvents such that the supply speeds match the target mobile-phase composition ratio, thereby introducing the mobile-phase solvents continuously changing in composition ratio within set time into the column. The other type is called a low-pressure gradient method, in which a solvent switching device is provided upstream of one pump, the solvent switching device is connected to a plurality of types of solvents, the solvents are sequentially selected based on the pumping speed of the pump such that the pumped volumes of the solvents produce the target mobile-phase composition ratio in a predetermined period, and the solvents having the target mobile-phase composition ratio are pumped and supplied, thereby introducing the mobile-phase solvents continuously changing in composition ration within set time into the column.

Each of the above-described pumps generally includes pistons for pumping and discharging the mobile phase, check valves, a pressure damper for reducing pulsation, and a pressure gauge for measuring pressure.

In the low-pressure gradient method, the solvent switching device is connected to the mobile-phase pumping section. It is especially important in this method to quickly provide the selected solvent composition ratio. Therefore, the pump needs to have good solvent exchange.

In both the high-pressure gradient method and the low-pressure gradient method, it is necessary to monitor a change in pressure in the chromatograph with a pressure gauge in order to discover problems in the chromatograph.

If the pressure changes largely during the continuous supply of solvents or if a very large pressure fluctuation occurs, it is highly possible that some problem has occurred in the chromatograph.

For example, if the pressure is higher than usual, clogging may have occurred in the flow path. Since some separation columns do not have high pressure resistance, depending on the type, it is necessary to protect those columns by setting an upper pressure limit. If the pressure is lower than usual, or if a very large fluctuation occurs, solvent leakage from the flow path may occur.

Consequently, a high-precision pressure gauge is required to perform troubleshooting appropriately.

A supercritical fluid chromatograph (SFC) is formed of pumps for supplying the mobile phase, an automatic sampler for injecting a sample, a column for separating the sample, and a detector for detecting the sample, as the HPLC. A back pressure regulator for controlling the pressure in the system is further provided downstream thereof.

The SFC is used for separation as well as analysis, as the HPLC, and includes pumps for supplying the mobile phase, a detector for detecting a sample, and a back pressure regulator for controlling the pressure in the system. A supercritical fluid extraction (SFE) apparatus also includes a back pressure regulator.

The back pressure regulator used in the SFC and SFE systems is generally formed of a pressure gauge for measuring the pressure in the system and a valve. Since a separated or extracted component is taken downstream of the back pressure regulator to recover the separated samples, if the solvent exchange is low, contamination of separated samples may occur. Therefore, the pressure gauge needs to have good solvent exchange.

Principle of Measurement in Conventional Pressure Gauges

The principle of measurement in conventional pressure gauges will be described below. A pressure gauge 10 shown in FIG. 1 used in pumps of an HPLC, SFC, or SFE system or in a back pressure regulator of an SFC or SFE system is disposed in a vessel used for measuring pressure and measures the pressure of a solvent filled in the vessel. The conventional pressure gauge 10 is provided with a strain gauge 14 for outputting the strain of a thin diaphragm 12 formed at a tip of the housing as an electrical signal. When pressure is applied to the diaphragm 12 from the outside, the diaphragm 12 is deformed, and the amount of deformation is measured as a change in resistance by the strain gauge 14.

Internal Structure of Conventional Pressure Gauges

The vessel shapes of these pressure gauges are broadly divided into two types according to the method of pumping and discharging the solvent. One is a flow type, in which a fluid passes through a flow path inside the pressure gauge, as shown in FIG. 2.

A flow-type diaphragm pressure gauge 20 includes a pressure meter support 22 for supporting a pressure meter (not shown), a pressure vessel 24, a connection section 26 for connecting the pressure meter support 22 and the pressure vessel 24, a diaphragm 30, a strain gauge 28 attached to the diaphragm 30, a flow path 32 for a fluid, and an inlet 34 and outlet 36 of the flow path 32.

The fluid runs into the flow path 32 from the inlet 34 and passes through the flow path 32. The pressure of the fluid is conveyed to the diaphragm 30, and a strain is produced at the diaphragm 30. The strain gauge 28 detects the strain and sends it as an electrical signal to the pressure meter. The fluid is discharged from the flow path 32 at the outlet 36.

The other is a stagnation type, in which a fluid runs into the pressure gauge and stagnates there, as shown in FIG. 3.

A stagnation type diaphragm pressure gauge 40 includes a pressure meter support 42 for supporting a pressure meter (not shown), a pressure vessel 44, a connection section 46 for connecting the pressure meter support 42 and the pressure vessel 44, a diaphragm 50, a strain gauge 48 attached to the diaphragm 50, a stagnation section 52 for a fluid, and a fluid inlet 54 into the stagnation section 52.

The fluid runs into the stagnation section 52 from the inlet 54. The pressure of the fluid is conveyed to the diaphragm 50, and a strain is produced at the diaphragm 50. The strain gauge 48 detects the strain and sends it as an electrical signal to the pressure meter. The fluid is gradually discharged from the inlet 54.

Solvent Exchange Problems in Conventional Pressure Gauges

Both the flow-type and stagnation type pressure gauges are used for pumps in HPLC, SFC, and SFE systems. The flow type is more desirable than the stagnation type because the mobile-phase solvent stagnates in the stagnation type due to its internal structure, providing very low solvent exchange. A large amount of solvent is necessary to change the type of a mobile-phase solvent.

Low solvent exchange in the stagnation type is a fatal problem in the low-pressure gradient method due to the following reason. If a pump having a stagnation type pressure gauge is used in the low-pressure gradient method, since the stagnation section of the pressure gauge has low solvent exchange, even if the mobile-phase composition ratio is correctly controlled, a solvent that is delivered from the stagnation-type of pressure gauge, having a different composition ratio is gradually discharged and mixed with the mobile phase, making the composition ratio of the mobile phase supplied from the pump different from the controlled composition ratio. This is not desirable because it prevents measurement of a correct chromatogram.

Also for the pressure gauges of the back pressure regulators in SFE and SFE systems, the flow type is more desirable than the stagnation type because the very low solvent exchange of the stagnation type causes a separated or extracted sample to mix with the stagnating solvent, reducing the purity of the recovered sample.

Therefore, flow-type pressure gauges, having internal structures where a fluid passes through the gauges, are generally used for the pumps and the back pressure regulators in HPLC, SFC, and SFE systems.

Even the flow-type pressure gauges, however, have insufficient solvent exchange. FIG. 4 shows the flow rate distribution of a solvent in the flow-type pressure gauge shown in FIG. 2. A thicker arrow indicates a higher flow rate. The solvent has a high flow rate around the center line which connects the inlet and outlet of the vessel in a straight line but has a lower rate as the solvent approaches the periphery. In other words, the solvent tends to stagnate at the periphery.

Since the conventional pressure gauges have a sufficient large dead volume compared with flow path pipes, and a low-flow portion exists therein, causing the solvent to stagnate.

Problems Related to Reducing Internal Capacity of Flow-Type Pressure Gauges

In addition, it is difficult to reduce the internal capacity, where a fluid is filled, of the flow-type pressure gauges.

Problems that tend to occur when the internal capacity of the flow-type pressure gauges is reduced in order to improve the solvent exchange thereof have been examined. Since the circular diaphragm receives the pressure in this type, the entire surface thereof needs to contact the fluid whose pressure is to be measured. Reducing the internal capacity of the pressure gauges means reducing the distance (gap) between the diaphragm and the pressure vessel in a pressure converter. If this distance is reduced too much, however, the solvent has a very low flow rate at the periphery shown in FIG. 4, preventing good solvent exchange. The practical minimum distance is 0.5 mm. The corresponding minimum capacity of the pressure gauge is calculated to be 40 µl.

In practice, it is difficult to reduce the internal capacity of diaphragm pressure converters, which are generally used. Therefore, it is nearly impossible to improve the solvent exchange from the current level if diaphragm pressure converters are used.

It was thought that good solvent exchange could be provided if a strain gauge were directly attached to a straight pipe, as described in Japanese Unexamined Patent Application Publication No. Hei-10-132676.

Since pressure is applied to the entire circumference of a pipe, a strain may be produced at a portion where a strain gauge is not attached. As a result, the measurement precision decreases because a strain is not correctly produced at the strain gauge, especially when pressure starts to be applied.

In addition, general strain gauges cannot work effectively at curved portions. Since the resistive member of the strain gauge is disposed on an adhesive layer that bonds the resistive member to the gauge base above the gauge base, when the strain gauge is attached to a curved surface, it means that the resistive member is attached to the outer circumference but shifted from the curved surface by the thickness of the gauge base and the adhesive layer. Therefore, a strain produced at the resistive member becomes larger than usual and an error is likely to occur. To prevent an error, the strain gauges need to be attached to a flat surface.

There has been a demand for pressure gauges that do not prevent the flow of a fluid flowing through a pipe in HPLC, SFC, and SFE systems and that provide high measurement precision.

SUMMARY OF THE INVENTION

The present invention has been made to improve the solvent exchange of pressure gauges mounted to pumps or back pressure regulators in HPLC, SFC, and SFE systems. An object of the present invention is to provide a pressure gauge that does not prevent the flow of a fluid flowing through a pipe, that is directly connected to the pipe to measure a strain produced when pressure is applied, and that corrects the measured value according to the temperature, and to provide a pressure measurement method having improved measurement precision by using the pressure gauge and an expression specified for each pressure range.

The foregoing object is achieved in one aspect of the present invention through the provision of a pressure gauge for measuring the pressure of a fluid flowing through a pipe, which includes a metallic pressure gauge body having a straight and cylindrical internal space penetrating the pressure gauge. The pressure gauge body includes a strain-measurement strain gauge attaching surface on the outside surface of the pressure gauge, at a portion having a thickness where pressure produced in the internal space when a fluid is made to flow through the internal space can be substantially detected with a strain gauge attached, the strain-measurement strain gauge attaching surface being at a part of the outside periphery of the internal space; and the portion other than the strain-measurement strain gauge attaching surface, the portion having a thickness where the pressure produced in the internal space is substantially impossible to detect even with a strain gauge attached. Pipes are connected to both ends of the internal space, and the pressure gauge is installed through the flow path of the fluid. A strain-measurement strain gauge is attached to the strain-measurement strain gauge attaching surface to measure the pressure in the pipe.

Here, the thickness means the thickness between the inside wall of the internal space and the outside surface of the pressure gauge.

The thickness where the pressure can be substantially detected is close to a thickness that allows a strain gauge to detect a strain at the strain gauge attaching surface. For example, if the thickness between the internal pipe and the gauge exceeds 4 mm in a pressure range of 50 to 100 MPa, it is substantially impossible to measure the pressure for stainless steel. If the thickness between the internal pipe and the gauge exceeds 10 mm in a pressure range of 0 to 20 MPa, it is substantially impossible to measure the pressure for a resin.

It is preferred that an area of the strain-measurement strain gauge attaching surface is less than 20% of an area of the whole outside surface of the pressure gauge.

It is necessary to take into account the thermal expansion of the steel member caused by the heat of the fluid flowing through the pipe in order to measure the pressure correctly.

It is preferred that the pressure gauge further include a temperature-correction strain gauge attaching surface, at a portion having a thickness where pressure produced in the internal space when a fluid is made to flow through the internal space is substantially impossible to detect with a strain gauge attached and also having a thickness where a strain of a component member of the pressure gauge caused by thermal expansion due to the heat of the fluid can be detected. A temperature-correction strain gauge is attached to the temperature-correction strain gauge attaching surface to measure the strain caused by the thermal expansion of the pressure gauge to correct the pressure value.

The thickness where the pressure is substantially impossible to detect is close to a thickness that does not allow a strain gauge to detect a strain at the strain gauge attaching surface. In other words, the strain gauge attaching surface has a sufficient thickness to show almost no expansion caused by the pressure from the internal space.

To increase measurement precision, a temperature-corrected signal output is further corrected by using an expression to obtain the pressure.

It is preferred that a pressure value Y be calculated by substituting the signal output value X of the strain gauge into a linear expression Y=aX+b, where a and b are set for each predetermined pressure range, or a pressure value Y be calculated by substituting the signal output value X of the strain gauge into a polynomial $Y=a_1X^{\wedge}(n-1)+a_2X^{\wedge}(n-2)+\ldots+a_nX^{\wedge}0$ that represents the relationship between the pressure value Y and the signal output value X in all pressure ranges, with $a_i$(i=1 to n) specified accordingly.

A pressure gauge according to the present invention can also be used as a joint for connecting pipes. It is preferred that the fluid inlet and outlet of the internal space of the pressure gauge be connected to pipes of an apparatus so as to serve as a joint for joining the pipes.

A pressure gauge according to the present invention can also be used for a pump or a back pressure regulator.

It is preferred that the fluid inlet and outlet of the internal space of the pressure gauge be connected to pipes of a pump of the present invention to measure the pressure of the fluid in the pressure gauge.

It is preferred that the fluid inlet and outlet of the internal space of the pressure gauge be connected to pipes of a back pressure regulator according to the present invention to measure the pressure of the fluid in the pressure gauge and to set the pressure to a desired setting.

A pump having a pressure gauge according to the present invention can be used in an HPLC apparatus, an SFC apparatus, and an SFE apparatus. A back pressure regulator having a pressure gauge according to the present invention can be used in an SFC apparatus and an SFE apparatus.

It is preferred that an HPLC apparatus according to the present invention include the pump.

It is preferred that an SFC apparatus according to the present invention include the pump.

It is preferred that an SFC apparatus according to the present invention include the back pressure regulator.

It is preferred that an SFE apparatus according to the present invention include the pump.

It is preferred that an SFE apparatus according to the present invention include the back pressure regulator.

Improvement in Solvent Exchange

As described above, since a steel member having a straight and cylindrical internal space passing therethrough, according to the present invention, is directly connected to pipes of an HPLC, SFC, or SFE apparatus, the pressure gauge of the present invention is reduced in size compared with a conventional diaphragm pressure gauge. For example, a pressure gauge of the present invention provided with a flow path having an inside diameter of 1.0 mm and a length of 10 mm has a capacity of 8 µl, which is one fifth of the minimum capacity (40 µl) of the conventional pressure gauge.

In addition, the pressure gauge of the present invention has a straight flow path for pipes connected therebefore and thereafter, avoiding fluid stagnation, whereas the conventional pressure gauge has an inside dead volume sufficiently larger than the flow path, a part of which does not provide good flow, which is likely to cause fluid stagnation.

Since the pressure gauge of the present invention has a smaller inside capacity and a smooth fluid flow, it provides highly improved solvent exchange.

Improvement in Measurement Precision

As described above, in a pressure gauge of the present invention, a strain gauge is not directly attached to the pipe. A strain-measurement strain gauge attaching surface and a temperature-correction strain gauge attaching surface are provided on a metal having a straight and cylindrical internal space passing therethrough, and a strain-measurement strain gauge and a temperature-correction strain gauge are attached on the surfaces.

In addition, in the present invention, the portion other than the strain-measurement strain gauge attaching surface has a thickness that provides strength where the pressure in the internal space is substantially impossible to detect even with a strain gauge attached.

A strain occurs at the entire periphery of a pipe, and the strain tends to remain. Especially when the pressure is reduced, the corresponding strain needs time to be released. Therefore, a method of attaching a strain gauge on an outside wall of a pipe is not suited to measuring a pressure that is changing.

In contrast, in the present invention, since a portion that is deformed by pressure is enclosed by a portion that is not deformed by the pressure, the original shape is recovered quickly when the pressure is released. In other words, by enclosing a portion that becomes strained by applied pressure (portion sensitive to pressure) with a portion that does not become strained by the pressure, the strain at the portion sensitive to pressure, when pressure is repeatedly applied and released, can instantly vanish, that is, the original shape, having no strain, can be instantly recovered. Even when the internal pressure changes, the amount of strain instantly reflects the internal pressure.

Therefore, since the pressure gauge of the present invention has a portion that does not become strained by applied pressure, the pressure can be measured with higher response.

In the method of directly attaching a strain-measurement strain gauge to a pipe having a uniform wall thickness, since the entire pipe becomes strained when pressure is applied to the pipe, a steel surface used to perform temperature correction for the strain gauge cannot be obtained.

In the present invention, a temperature-correction strain gauge can be attached to the portion that does not become strained by applied pressure, to measure the thermal expansion of the steel member constituting the pressure gauge. Thus, the present invention allows temperature correction.

The pressure measured by a pressure gauge of the present invention has a sufficient measurement precision with small variations compared with that of a conventional diaphragm pressure gauge. Higher measurement precision can be provided when the signal output of the strain gauge is corrected by using one of the following expressions to calculate the pressure value: $Y=aX+b$, where Y indicates the pressure value, X indicates the signal output value, and a and b are set for each predetermined pressure range; and $Y=a_1X^{(n-1)}+a_2X^{(n-2)}+ \ldots +a_nX^0$, where $a_i(i=1$ to n) is specified such that the expression is satisfied in all pressure ranges.

Production Cost

In the conventional pressure gauge, the pressure gauge body and the vessel have large volumes, and therefore, a lot of metal is used. In addition, a strain gauge needs to be attached to the inside of the pressure gauge body, which is highly technical. Thus, the total cost becomes high. In contrast, a pressure gauge of the present invention has a volume similar to that of a hexagonal pipe joint and a strain gauge is attached to the outside. Therefore, the pressure gauge of the present invention can be produced with a lower cost in terms of material and technology.

Size of Pressure Gauge

A pressure gauge of the present invention can have the same size as a hexagonal pipe joint, which is far smaller than the conventional pressure gauge. The pressure gauge of the present invention can be installed in a smaller space, reducing the size of a pump or a back pressure regulator in which the pressure gauge is used, and also allowing a variety of uses. The pressure gauge can also be used as a pipe joint, providing high usability.

Application of Pressure Gauge

Since a pressure gauge of the present invention serves as a joint that connects flow-path pipes, it can function as a part of a chain of a flow path (a continuous flow path pipe). Since the pressure gauge can be used at a plurality of positions in the flow path, the pressure can be continuously measured at the positions in a chromatograph or an extraction apparatus during chromatograph measurement or during extraction, and the pressure can be associated with the chromatogram obtained thereby. Therefore, the pressure gauge of the present invention can be used in a pump or a back pressure regulator, and in addition, can provide a pressure profile obtained by continuously measuring the pressure at each position during chromatogram measurement or during sample extraction.

This is effective as validation information indicating the validity of the chromatogram or the extracted sample. Especially in chromatography, it is expected that the pressure profile is used as data for the system suitability test, an actual task of performance qualification (confirmation of validity when used).

DESCRIPTION OF THE PREFERRED EMBODIMENTS

Pump According to Embodiment

Figure 1:
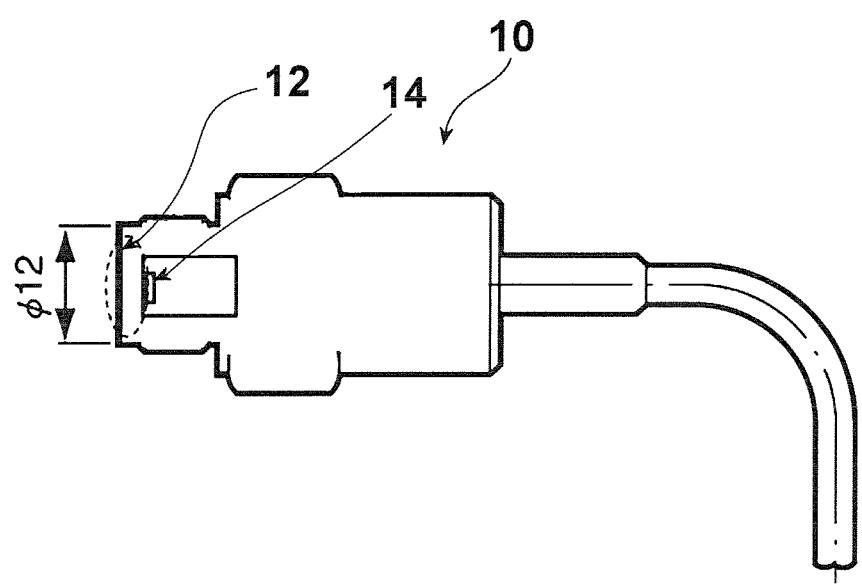
FIG. 1 illustrates the general pressure gauge.
Figure 2:
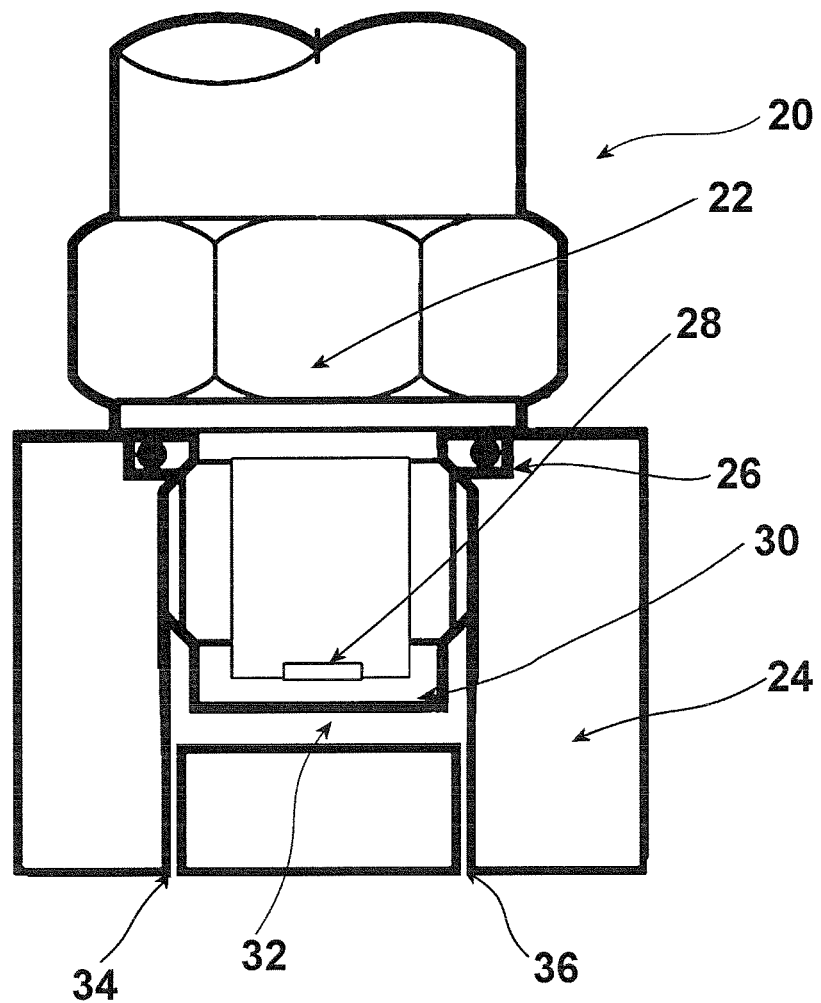
FIG. 2 illustrates the inner structure of the flow-type diaphragm pressure gauge.
Figure 3:
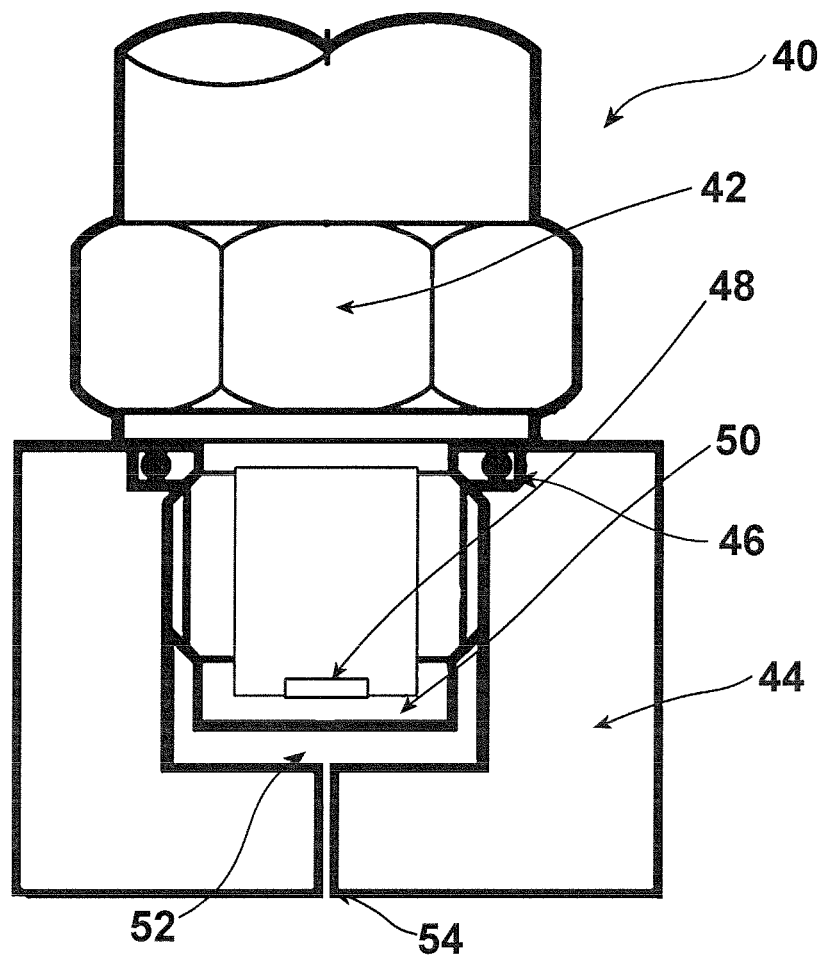
FIG. 3 illustrates the inner structure of the stagnation type diaphragm pressure gauge.
Figure 4:
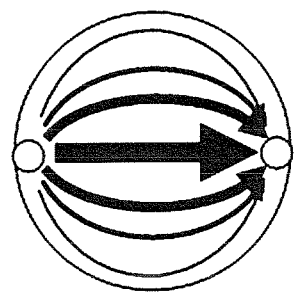
FIG. 4 illustrates the flow velocity distribution of the solvent in a flow-type diaphragm pressure gauge.
Figure 5:
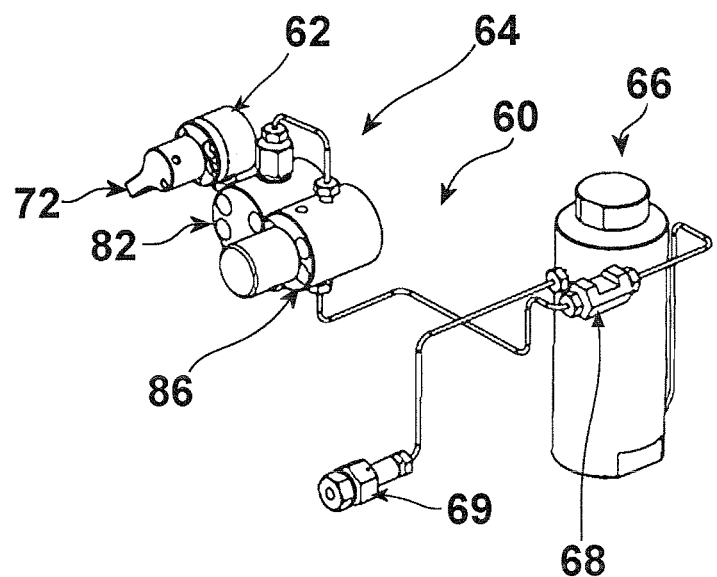
FIG. 5 illustrates the flow path of the pump in the HPLC, SFC, or SFE system.

FIG. 5 shows flow paths in a pump 60 that uses a pressure gauge according to the present invention, in an HPLC, SFC, or SFE system.

The pump 60 includes a solvent selecting valve 62 provided with a selecting switch 72, a pump head 64 provided with a first pump head 82 and a second pump head 86, a pressure gauge 68 according to the present invention, a damper 66, and an outlet filter 69.

A solvent flowing from the solvent selecting valve 62 is supplied to the damper 66 at a constant solvent flow rate controlled by the pump head 64. Since the damper 66 reduces pulsation that could not be adjusted by the pump head 64, constant pressure is maintained. The pressure is detected by the pressure gauge 68. When the pressure gauge 68 detects a pressure much higher or much lower than usual, it means that some problem has occurred in the HPLC, SFC, or SFE system. When the separation column does not have high pressure resistance, the pump head 64 can set the upper pressure limit of the solvent so as not to exceed the pressure limit of the separation column. The solvent is discharged through the outlet filter 69 at a desired flow rate.

The pressure gauge according to the present invention can be disposed in a flow path as a joint. Thus, the pressure gauge can be disposed in the pump more easily than the conventional pressure gauges. In addition, since the pressure gauge of the present invention is small, the pump itself can be reduced in size.

Components of Pump

Figure 6:
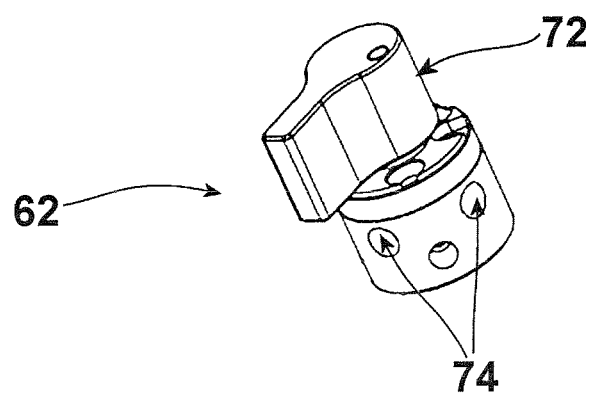
FIG. 6 illustrates the solvent selecting valve of the pump in the HPLC, SFC, or SFE system.

Inlet tubes (not shown) for introducing the mobile phase from a solvent reservoir or from a deaerator are connected to inlet-tube mounting holes 74 of the solvent selecting valve 62, shown in FIG. 6. A plurality of inlet tubes can be connected to the solvent selecting valve 62, and the type of the mobile phase can be switched according to use by the selecting switch 72.

Figure 7:
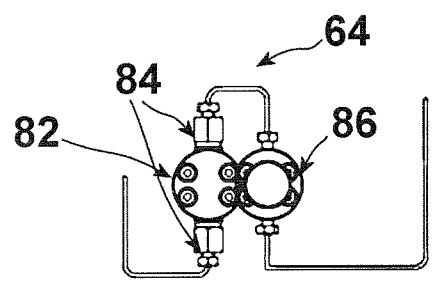
FIG. 7 illustrates the pump head in the HPLC, SFC, or SFE system.

Then, the mobile phase is supplied to the pump head 64, shown in FIG. 7.

The pump head 64 is provided with the first pump head 82, for solvent supply, provided with check valves 84 at the top and bottom, and the second pump head 86, for solvent flow rate adjustment.

The mobile phase is supplied to the first pump head 82 first. The check valve in the first pump head 82 prevents the mobile phase from flowing backward. Then, the mobile phase is supplied to the second pump head 86. The second pump head 86 smoothes the pulsation generated when the first pump head 82 supplies the mobile phase and performs adjustment such that the mobile phase is always supplied at a constant flow rate.

Figure 8:
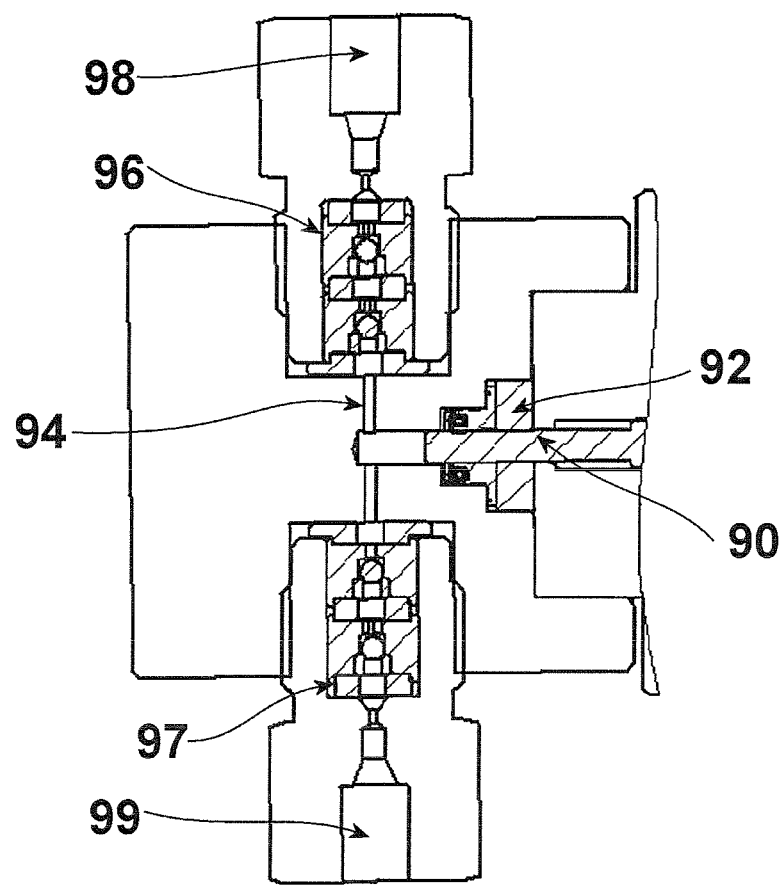
FIG. 8 illustrates the plunger of the pump head in the HPLC, SFC, or SFE system.

The mobile phase is supplied to the pump of FIG. 5 by the back and forth movement of a plunger 90 shown in FIG. 8. The plunger 90 is made of ceramic or an artificial jewel (such as artificial sapphire).

The plunger 90 includes a plunger seal 92, an inlet flow path 99, an inlet check valve 97, a plunger flow path 94, an outlet check valve 96, and an outlet flow path 98.

Figure 9:
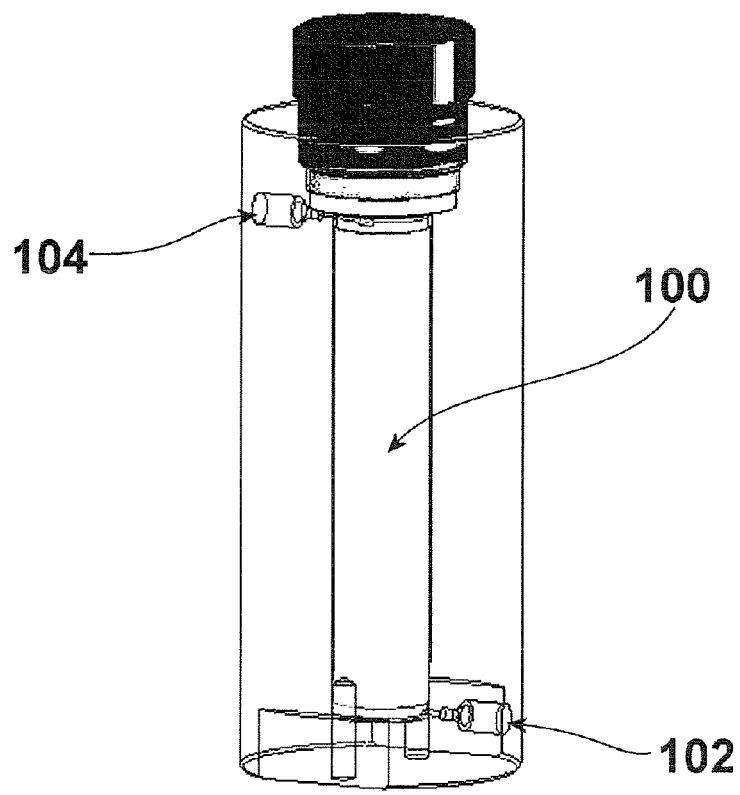
FIG. 9 illustrates the damper of the pump in the HPLC, SFC, or SFE system.

The mobile phase passes through the pipe, is introduced into the pump, and is supplied to the damper 100 (The damper 66 of FIG. 5 is the same damper.) shown in FIG. 9. The damper 100 includes a damper body, an inlet flow path 102, and an outlet flow path 104.

The damper 100 can use a solid, such as Teflon (registered trademark), a solvent, air, and various types of materials. The damper 100 reduces the pulsation that could not be adjusted by the pump head 64.

The pressure gauge of the present invention is disposed downstream of the damper 66 and is used to indicate the back pressure applied to the pump. The mobile phase passes through the pressure gauge, is supplied to the outside of the pump through the pipe, passes through the filter for removing foreign matter in the mobile phase, and is discharged from the pump.

Figure 10:
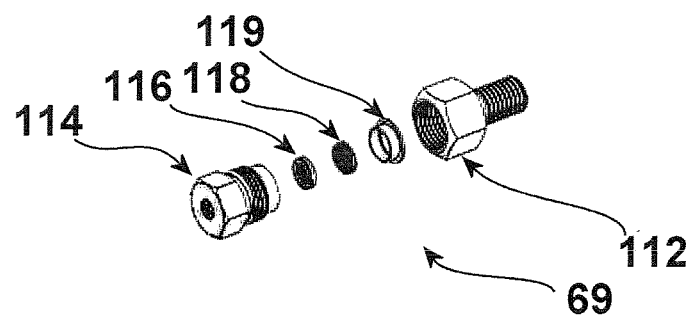
FIG. 10 illustrates the outlet filter of the pump in the HPLC, SFC, or SFE system.

The filter 69 shown in FIG. 10 includes a screw-type filter mount 112 for securing the filter to the fluid discharging part of the pump 60 by screwing, a screw-type filter holder 114 for accommodating two filter elements by screwing to the filter mount 112, a 1-µmm filter element 116, a 2-µm filter element 118, and a cap 119 for securing the filter elements so as not to move in the filter holder 114.

Since low-capacity pipes are used in the pump, and very-low-capacity pipes having an inside diameter of about 0.1 mm are used in a UHPLC system, it is important to remove foreign matter from the mobile phase thoroughly. To this end, a double filter structure is used in which the 1-µm filter element 116 and the 2-µm filter element 118 are used. The filter elements are generally made of stainless steel or Teflon (registered trademark). Filters having small capacities are mounted in pipes not only outside the pump but also inside the pump.

Since the UHPLC system generally requires a pressure limit as high as 130 MPa, the plunger needs to be driven precisely.

Figure 11:
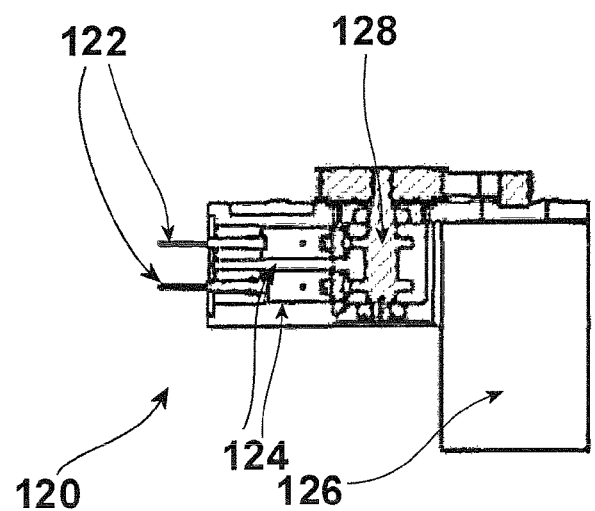
FIG. 11 illustrates the driving section of the plunger.

FIG. 11 shows the structure of a driving section 120 of the plunger, which supplies the mobile phase.

The plunger driving section 120 includes plunger tips 122, a stepper motor 126 for operating the plunger tips 122, a cam 128 that rotates when driven by the stepper motor 126, and push rods 124 for driving the plunger tips 122 when the cam 128 rotates.

The stepper motor 126 rotates the cam 128, which drives the plunger tips 122. The stepper motor 126 has a fixed rotation angle per pulse. When the stepper motor 126 is driven in units of pulses, the motor shaft rotates and stops repeatedly, causing vibration. The stepper motor 126 has a resonance point where the maximum vibration occurs due to the relationship between the torque and the rotor according to the rotation speed. Usually, the stepper motor 126 is not used around the resonance point, but depending on the set flow rate, the stepper motor 126 may need to be operated around the resonance point, causing unusual sound.

To prevent these phenomena, the minimum step (one pulse) is further divided to rotate the motor shaft smoothly. By doing so, a fluid is supplied in a stable manner at low-speed rotation (low flow rate). The electrical current flowing into the motor is adjusted according to changes in load caused by the rotation speed of the motor (corresponding to the flow rate) and the back pressure, generating motor torque corresponding to the load.

As described before, since the UHPLC pump requires a high pressure limit, the plunger needs to be driven straight with very high precision (not to be tilted relative to the reciprocating direction), compared with the case where it is used in the HPLC pump. If the plunger is tilted even slightly, although it may cause no problem in the HPLC pump, it can cause fluid leakage or fluid supply failure in the UHPLC pump. In order to maintain the straight movement of the plunger, the push rods, which convey power from the cam to the plungers, are improved in the present invention.

One improvement is to connect a plunger tip and a push rod tip in a secure manner. To described this in more detail, FIG. 12 and FIG. 13 show conventional and improved connection portions of the plunger tips and the push rod tips, respectively.

Figure 12:
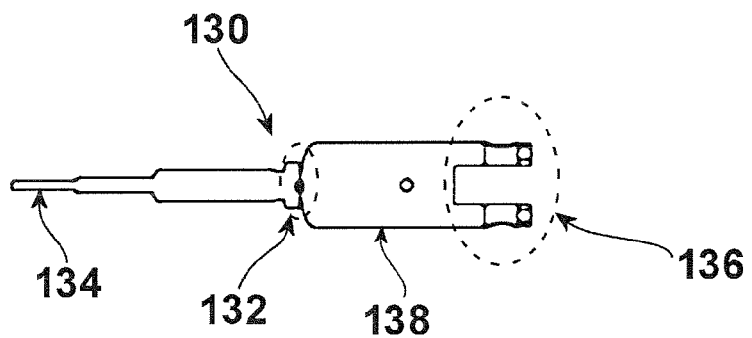
FIG. 12 illustrates the push rod includes the plunger tip having a curved convex surface.

A conventional push rod 130 shown in FIG. 12 includes a plunger tip 134, a push rod 138, a support portion 132 for supporting the plunger tip 134 and the push rod 138, and a push rod actuating portion 136.

Figure 13:
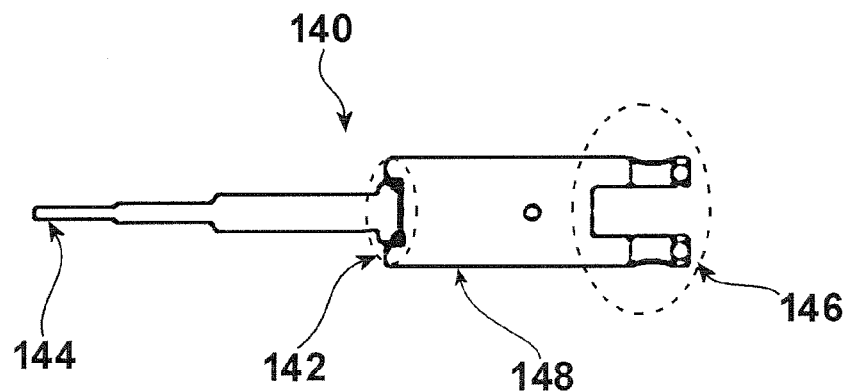
FIG. 13 illustrates the push rod includes the plunger tip having a curved concave surface.

An improved push rod 140 shown in FIG. 13 includes a plunger tip 144, a push rod 148, a support portion 142 for supporting the plunger tip 144 and the push rod 148, and a push rod actuating portion 146.

Power from the cam is conveyed to the plunger through the push rod. In the HPLC pump, as shown by a dotted line in FIG. 12, the tip of the push rod 130 has a curved convex surface and it supports an end of the plunger tip 134 at one point. In contrast, in the UHPLC pump, as shown by a dotted line in FIG. 13, the tip of the push rod 140 has a curved concave surface and it supports an end of the plunger tip 144 at an arc. Therefore, the axis of the plunger and the axis of the push rod need to be aligned just at the center point of the contact surface. The plunger is moved in a straight line with high precision by this structure.

A positional shift caused by vibration applied to the pump head is also reduced.

Figure 14:
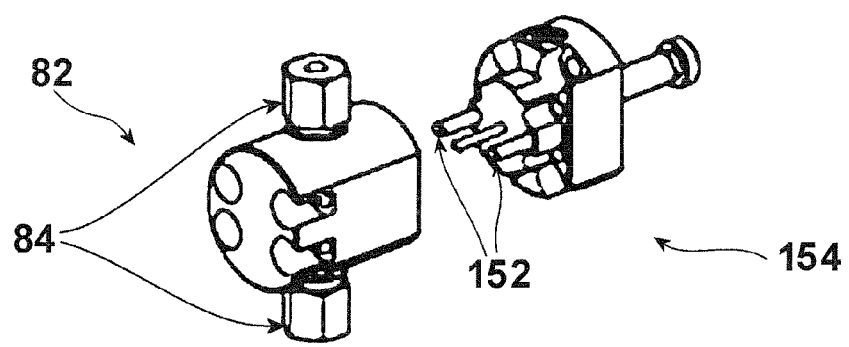
FIG. 14 illustrates the guide pins used for positioning, to prevent the pump head from tilting.

As shown in FIG. 14, the first pump head 82 includes a flange 154 for securing the pump head 82 and guide pins 152 for preventing the pump head 82 from tilting.

Figure 15:
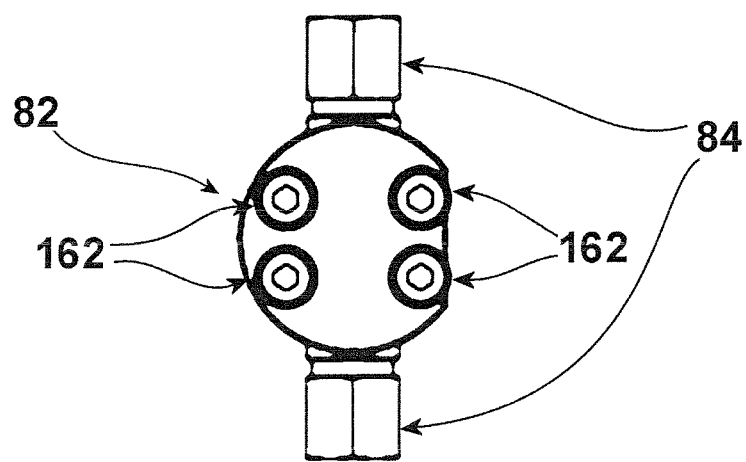
FIG. 15 illustrates the position secured the pump head by screws.

The flange 154 has the guide pins 152, which are long and used for positioning, to prevent the pump head 82 from tilting. As shown in FIG. 15, the pump head 82 is tightly secured to the flange 154 by screws 162 at four points disposed in a square.

Figure 16:
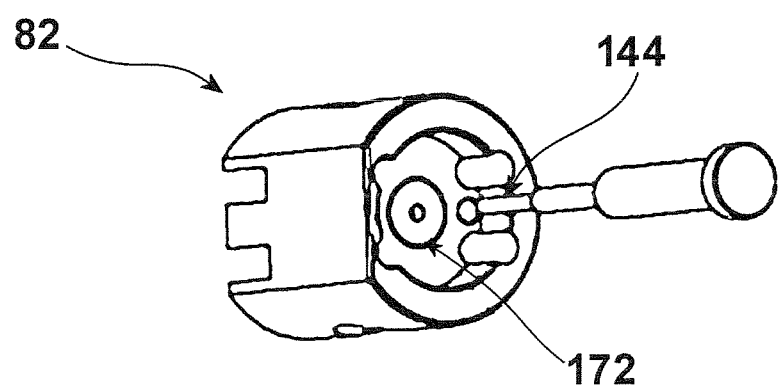
FIG. 16 illustrates the position of the backup ring in the pump head.

As shown in FIG. 16, the pump head 82 is provided with a backup ring 172 to keep the plunger tip 144 moving in a straight line.

At the rear of the seals (plunger seals) of the pump head, diaphragms are mounted.

Figure 17:
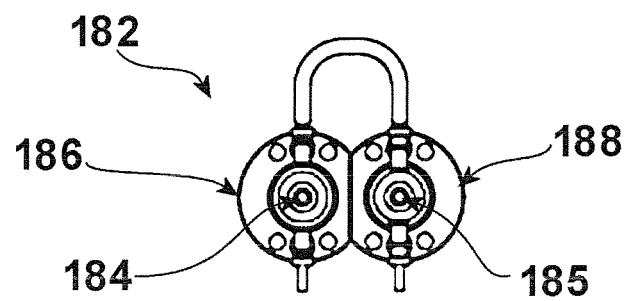
FIG. 17 illustrates the washing mechanism of the pump head.

As shown in FIG. 17, a plunger washing mechanism 182 includes plunger supports 186 and 188 and diaphragms 184 and 185.

When the plungers are moved back and forth, the diaphragms 184 and 185 are moved to actively make a washing solution flow. When the mobile phase is a buffer solution, a salt may be precipitated, damaging the sealant or the plungers or clogging the flow path. To avoid this, pure water is introduced to a space behind the plunger seals, the pure water is displaced by the movement of the diaphragms, and the precipitated salt is washed out.

Figure 18:
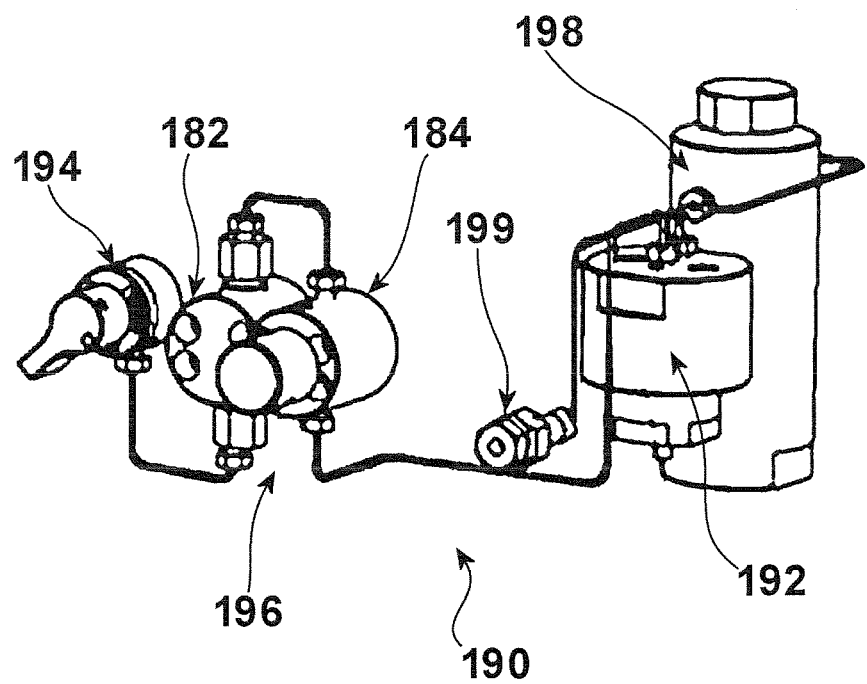
FIG. 18 illustrates flow paths in a pump that uses a conventional diaphragm pressure gauge.

FIG. 18 shows flow paths in a pump that uses a conventional diaphragm pressure gauge. A conventional pump 190 includes a solvent selecting valve 194, a pump head 196 provided with a first pump head 182 and a second pump head 184, a conventional pressure gauge 192, a damper 198, and an outlet filter 199.

This pump is the same as that shown in FIG. 5 except that the conventional pressure gauge 192 is used. The pressure gauge 192 has a large capacity. A fluid flowing from the damper 198 is taken into the pressure gauge 192, passes through a U-shaped flow path in the pressure gauge 192, and flows into the outlet filter 199.

When a pump for liquid chromatography is used to supply a fluid by the low-pressure gradient method, a plurality of types of solvents need to be supplied at the composition ratio that changes at predetermined time intervals. If the conventional pressure gauge is used, since the solvents stagnate inside the pressure gauge, the required composition ratio sometimes cannot be obtained within a predetermined period of time. In contrast, when the pressure gauge of the present invention is used, the required composition ratio can be obtained correctly within the predetermined period of time.

Since the pressure gauge of the present invention is made compact so that it can be used as a joint, a plurality of the pressure gauges can be disposed inside the pump. By doing so, a pressure difference between the pressure gauges can be detected to determine whether the flow path inside the pump is clogged.

Back Pressure Regulator According to Embodiment

Figure 19:
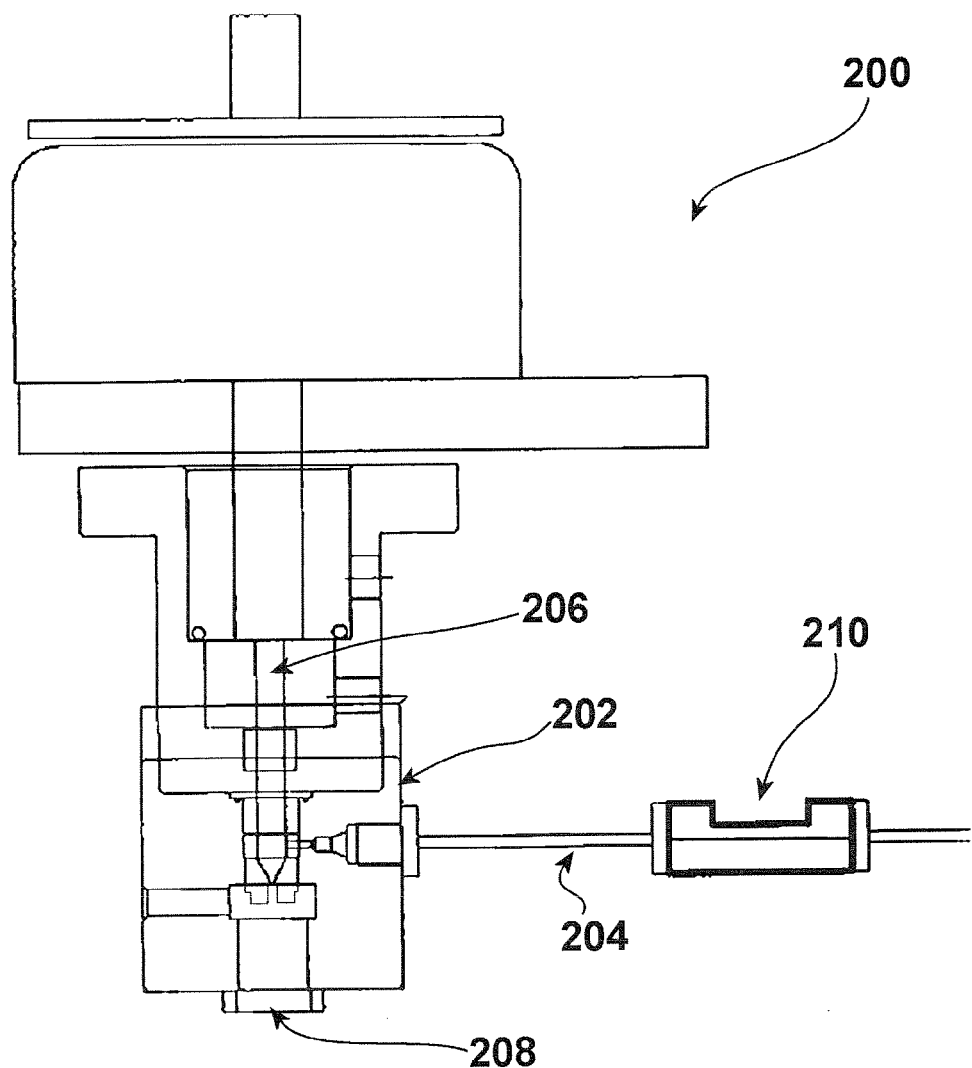
FIG. 19 illustrates the back pressure regulator according to the embodiment of the present invention.

FIG. 19 shows a back pressure regulator according to an embodiment of the present invention, which is used for supercritical fluid chromatography or supercritical fluid extraction and which employs a pressure gauge of the present invention.

A back pressure regulator 200 includes a valve body 202, a flow path 204 connected to the valve body 202, a valve member 206 disposed inside the valve body 202, a pressure gauge 210, and an outlet 208 for a fluid flowing from the flow path 204.

Figure 20:
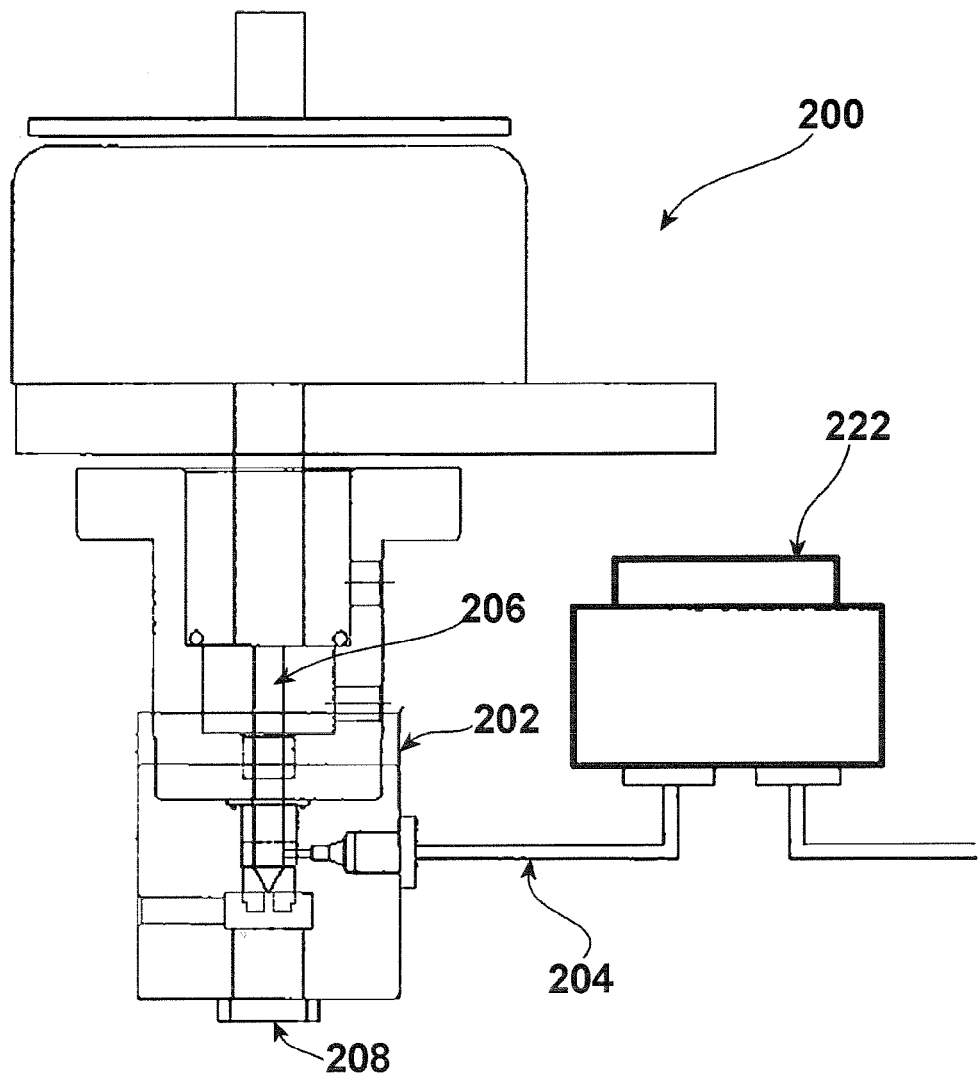
FIG. 20 illustrates the back pressure regulator to employ the conventional pressure gauge.

A comparative example that employs a conventional pressure gauge 222 is shown in FIG. 20. Components other than the conventional pressure gauge 222 are the same as in FIG. 19.

The pressure gauge 210 is connected to the flow path 204. When the pressure of a fluid flowing through the flow path 204 is higher or lower than a set pressure, the degree of opening/closing of the valve member 206 is changed to make the actual pressure match the set pressure.

Since the conventional pressure gauge 222 has a large volume, the places where it can be installed are limited compared with the pressure gauge of the present invention.

The pressure gauge of the present invention can be used as a joint in a flow path. Therefore, the pressure gauge of the present invention can be installed in the back pressure regulator more easily than the conventional pressure gauge, providing superior usability.

Since the pressure gauge of the present invention is compact, the back pressure regulator itself can be reduced in size.

Since the pressure gauge of the present invention does not prevent the flow of fluid in the pipe, it provides high solvent exchange. Especially when separation is performed, it is important to supply a sample that has reached the pressure gauge to a fraction collector disposed downstream of the outlet 208 while maintaining the purity of the sample. Because a fluid stagnates inside the conventional pressure gauge, the sample may expand, reducing the concentration, or the sample may become mixed with the next sample that flows out. In contrast, the pressure gauge of the present invention does not prevent the flow of fluid in the pipe and can supply the sample as is to the downstream side.

Prototype pressure gauges made before making a pressure gauge according to an embodiment of the present invention will be shown as Comparative Examples 1 and 2. First, their problems will be described, and then, the performance of the pressure gauge of the present invention will be examined compared with Comparative Examples 1 and 2.

COMPARATIVE EXAMPLE 1

As Comparative Example 1, a pressure gauge 1 in which a strain gauge was directly attached to a stainless steel pipe will be described. In the HPLC, SFC, and SFE systems, stainless steel pipes having an outside diameter of 1/16" (about 1.59 mm) are generally used. Their inside diameters are generally 0.1 mm, 0.25 mm, 0.5 mm, 0.8 mm, or 1.0 mm, and the inside diameter is determined based on the usage. The rate of change of the outside diameter was calculated with respect to the applied pressure.

$$ur = P1/(100E)\{(1-v)r_1^2 r\}/(r_2^2 - r_1^2) + (1+v)r_2^2 r_1^2\}/(r_2^2 - r_1^2)/r\}$$

where ur indicates a change in the radius of outside wall of a pipe in mm, $r_1$ indicates the radius of inside wall of a pipe in mm, $r_2$ indicates the outside the radius of outside wall of a pipe in mm, r is $(r_1+r_2)/2$, P1 indicates the inside pressure in $kg/cm^2$, P2 indicates the outside pressure in $kg/cm^2$, E indicates the longitudinal elasticity modulus of the material in $kg/mm^2$, and v indicates Poisson's ratio of the material.

Figure 21:
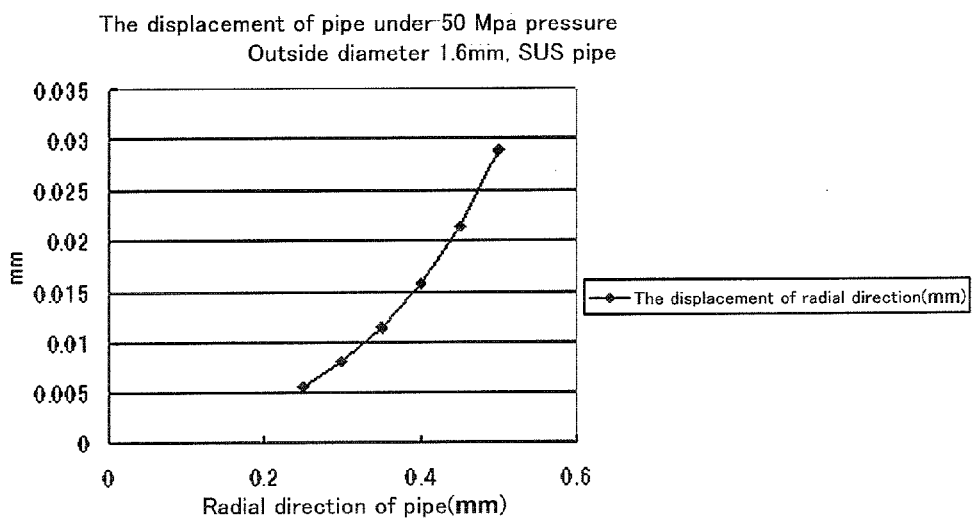
FIG. 21 illustrates changing the rate of the outside diameter for measured pressure.

When stainless steel is used as the material, E equals 19,200 $kg/mm^2$ and v equals 0.3. These values were substituted into the expression to obtain the result shown in FIG. 21. It was determined from FIG. 21 that an expansion of about 10 μm was expected when the inside diameter was 0.35 mm or more (0.8 mm or more for generally used pipes), which meant that the pressure could be measured. It was examined whether a pressure gauge could be implemented by attaching a strain gauge to a stainless steel pipe having an inside diameter of 0.8 mm, with the pipe serving as a pressure converter and a vessel as in the conventional pressure gauge.

Figure 22:
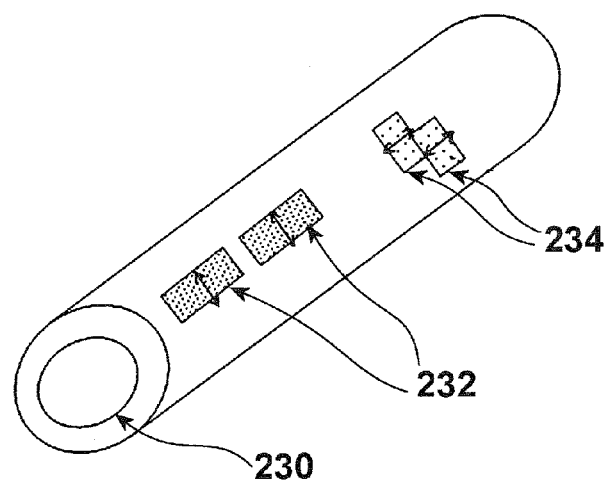
FIG. 22 illustrates the prototype pressure gauge 1.

FIG. 22 shows the prototype pressure gauge 1. A pipe 230 had an outside diameter of 1/16" and an inside diameter of 0.8 mm, was made of stainless steel, and was about 15 cm long. The strain gauge was a KFG series general strain gauge made by Kyowa Electronic Instruments Co., Ltd.

The pipe 230 expanded in the direction of the flow path and also in the directions perpendicular thereto.

The surface of the pipe 230 was sufficiently polished, two strain gauges 232 were attached to the pipe so as to detect strains in the radial directions, and two other strain gauges 234 were attached to the pipe so as to detect strains in the pipe longitudinal direction.

Arrows on the strain gauges 232 and 234 in the figure indicate the directions in which strains were detected by the strain gauges.

Figure 23:
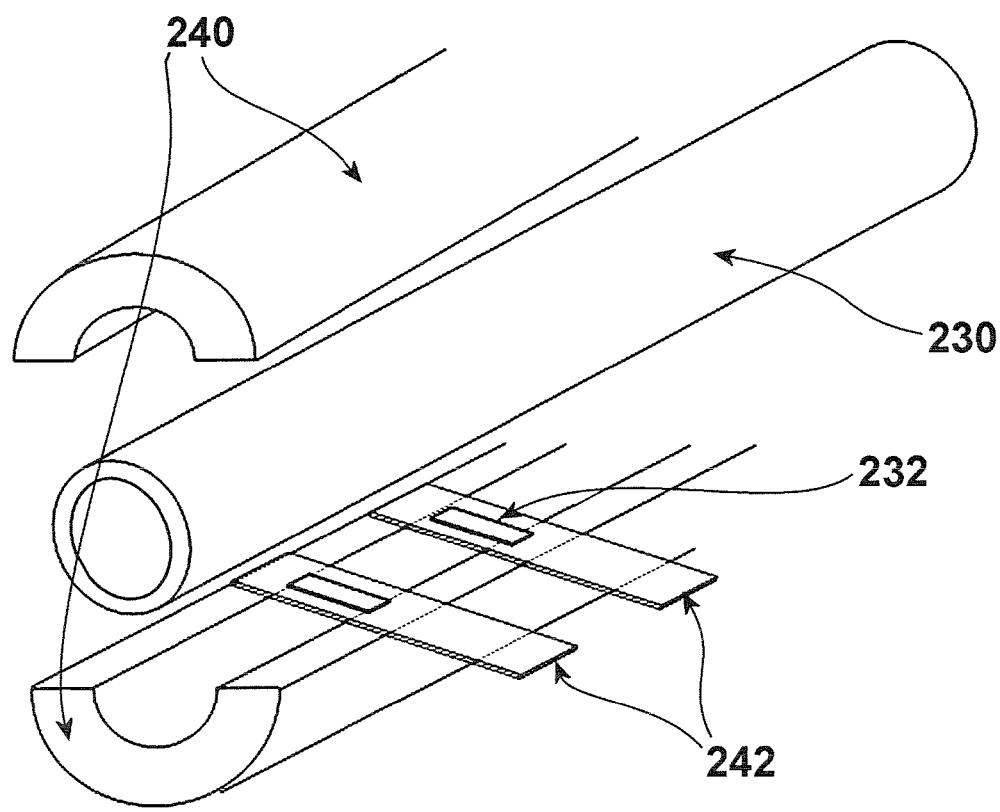
FIG. 23 illustrates the strain gauges were attached to the pipe.

When the strain gauge is attached to the surface, if air bubbles get into the space between the strain gauge and the attached surface, the strain cannot be correctly measured. It is easy to attach the strain gauge to a flat surface. However, since the pipe having an outside diameter of 1/16" has a curved surface clearly for the strain gauge, the strain gauge needs to be attached to the curved surface in some way that avoids air bubbles getting in between. As shown in FIG. 23, the strain gauges 232 were first put on adhesive tape 242, the strain gauges 232 and the adhesive tape 242 were then sandwiched by the pipe 230 and a half pipe made by axially cutting a pipe 240 having an inside diameter a little larger than the outside diameter of the pipe 230, and the strain gauges 232 were attached to the pipe 230. With this method, the strain gauges 232 were attached to the pipe 230 without any air bubbles getting in between.

Figure 24:
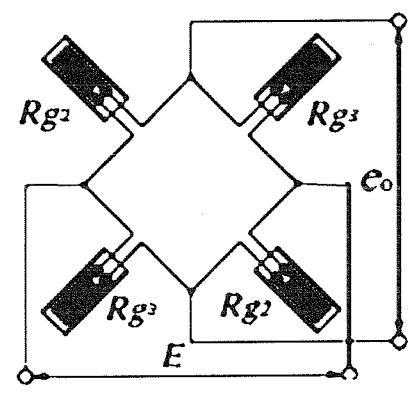
FIG. 24 illustrates the general bridge circuit.

The four strain gauges were used to form a general bridge circuit Rg1-4 shown in FIG. 24, and the pressure signal output was measured. The result is shown in FIG. 25.

Figure 25:
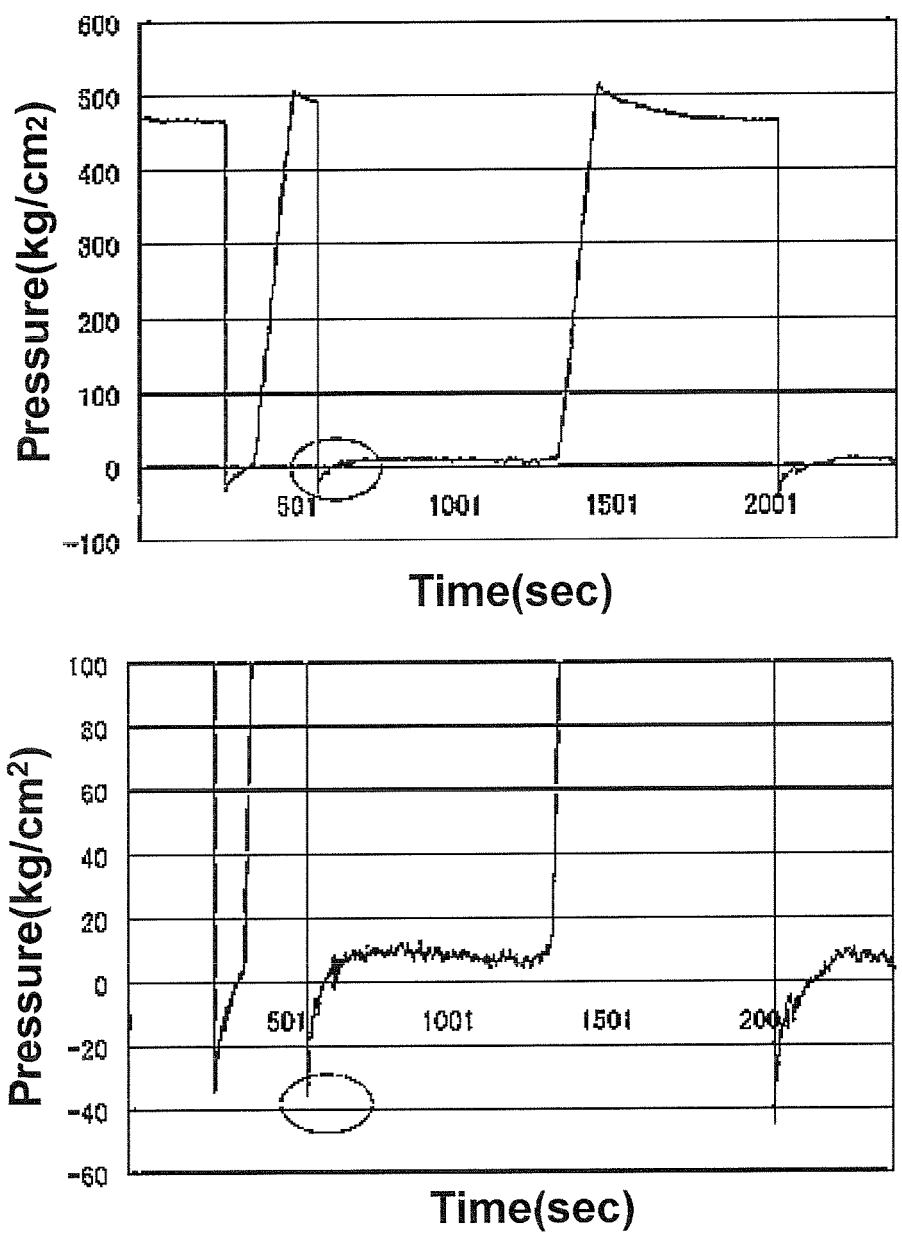
FIG. 25 illustrates the signal output changes of the pressure gauge 1.

In FIG. 25, the horizontal axis indicates time and the vertical axis indicates signal output changes caused by pressure changes. The signal output changes shown in FIG. 25 almost matched the actual pressure changes, which was satisfactory. However, when pressure was applied and then released, a wave-like minus output signal portion was observed at a part enclosed by a circle. This signal portion did not match the actual pressure and caused a problem in practice.

The invention in Japanese Unexamined Patent Application Publication No. Hei-10-132676 is similar to Comparative Example 1. Therefore, the same problem may occur and that invention has room for improvement in terms of measurement precision.

COMPARATIVE EXAMPLE 2

In the pressure gauge 1, when pressure was released, a wave-like minus output signal portion was observed. It was assumed that this was caused by a difference in strain propagation speed between the radial directions and the longitudinal direction in which the pressure affected the steel pipe. Moreover, the heat expansion of the steel pipe couldn't be disregarded.

Therefore, the strain gauges for the longitudinal direction were removed and then attached to a steel member connected to the pipe to perform temperature correction.

Figure 26:
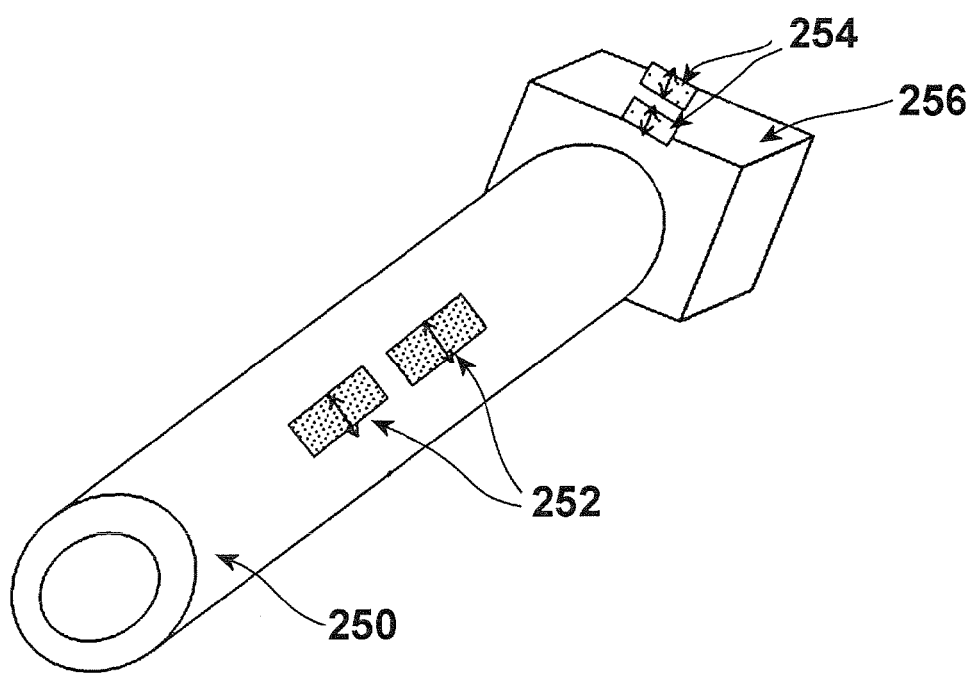
FIG. 26 illustrates the prototype pressure gauge 2.

In a pressure gauge 2, the strain gauges for detecting strains produced in the longitudinal direction were removed from the pressure gauge 1, and as shown in FIG. 26, strain gauges 254 were attached to a surface of a steel member 256 disposed in the vicinity of a pipe 250. The strain gauges 254 wee attached to the steel member 256, which had a temperature close to that of the pipe, in order to temperature-correct the signal output from the bridge circuit.

Figure 27:
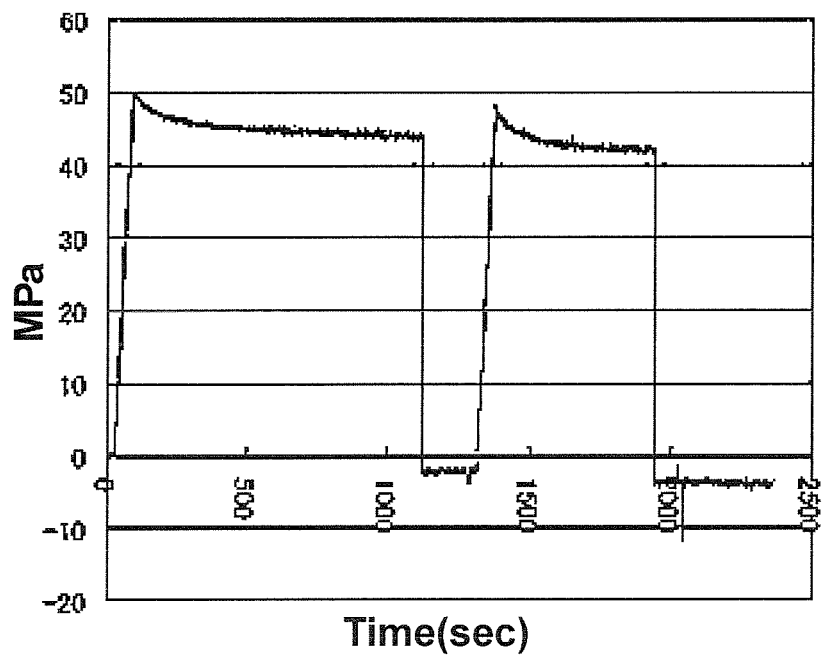
FIG. 27 illustrates the signal output changes of the pressure gauge 2.
Figure 27:
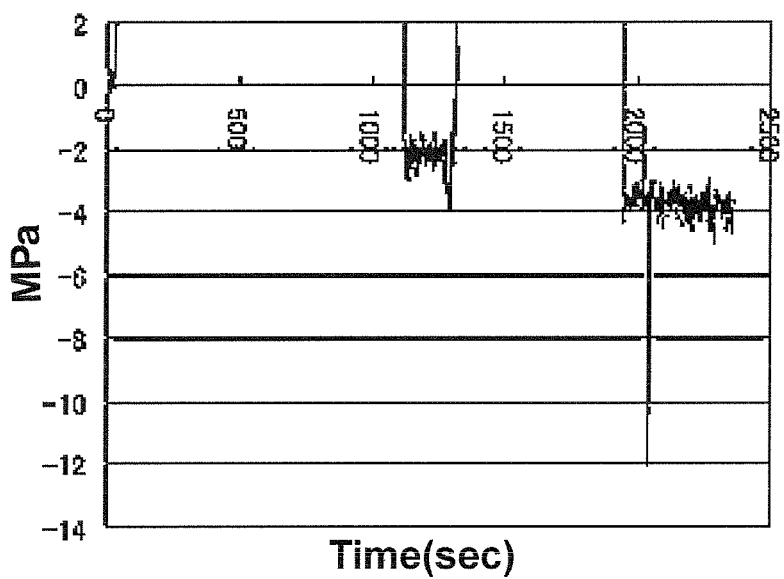

In FIG. 27, the horizontal axis indicates time and the vertical axis indicates signal output changes caused by pressure changes. The signal output changes shown in FIG. 27 almost matched the actual pressure changes, which was satisfactory. In addition, a wave-like minus signal portion, which was a problem in the pressure gauge 1, was reduced. However, as shown in the lower graph of FIG. 27, which is an enlarged view of the upper graph of FIG. 27, the signal output obtained when the pressure was released had a minus shifted portion, which caused a problem in practice. Further improvement was needed.

As indicated by the signal output changes in Comparative Examples 1 and 2, a correct measurement value could not be obtained especially when the pressure was released in the cases where the strain gauges were directly attached to the pipe. The reasons for that include the effect of strains produced at portions where the strain gauges were not attached because the pipe had strains on the entire surface (entire periphery), and the performance of the strain gauges on curved surfaces, which generally need to be attached to flat surfaces. From the measurement results in Comparative Examples 1 and 2, pressure measurement at the pipes had a large error and was not suitable. However, it was effective to measure the pressure by measuring minute strains produced at the outside wall of the pipe. Thus, a pressure gauge 3 satisfying the following conditions was made.

1. Strain signal values close to those obtained by the pressure gauges 1 and 2 were acquired.
2. Strain gauges were attached not on curved surfaces but on flat surfaces.
3. The portions other than those used for strain detection were robust enough not to have strains caused by the pressure.

To make the pressure gauge 3, a stainless steel block was prepared, a part thereof was cut away to provide a flat surface, the surface was sufficiently polished to serve as a strain-measurement strain gauge attaching surface, a straight flow path having an inside diameter of 1.0 mm was made at a position about 0.5 mm below the flat surface in the depth direction, peripheral portions had a wall thickness of 3 mm or more from the flow path so as to provide sufficient strength, and holes (receptacles) for ferrules or set screws to facilitate pipe connection were provided at the inlet and outlet of the flow path.

Preferred dimensions of the stainless steel block will be described below.

When the pressure gauge is made of a resin having a pressure limit of 10 MPa, the thickness of the pressure gauge is one to two millimeters is appropriate.

The inside diameter of the flow path preferably ranges from 0.25 mm to 2 mm because this range provides low fluid stagnation and low clogging in HPLC and SFC systems.

The length of the flow path preferably ranges from 10 mm to 20 mm because this range is necessary to attach a strain gauge. A longer flow path does not provide any merits, and if the flow path is longer, it is difficult to make the flow path in the block.

Figure 28:
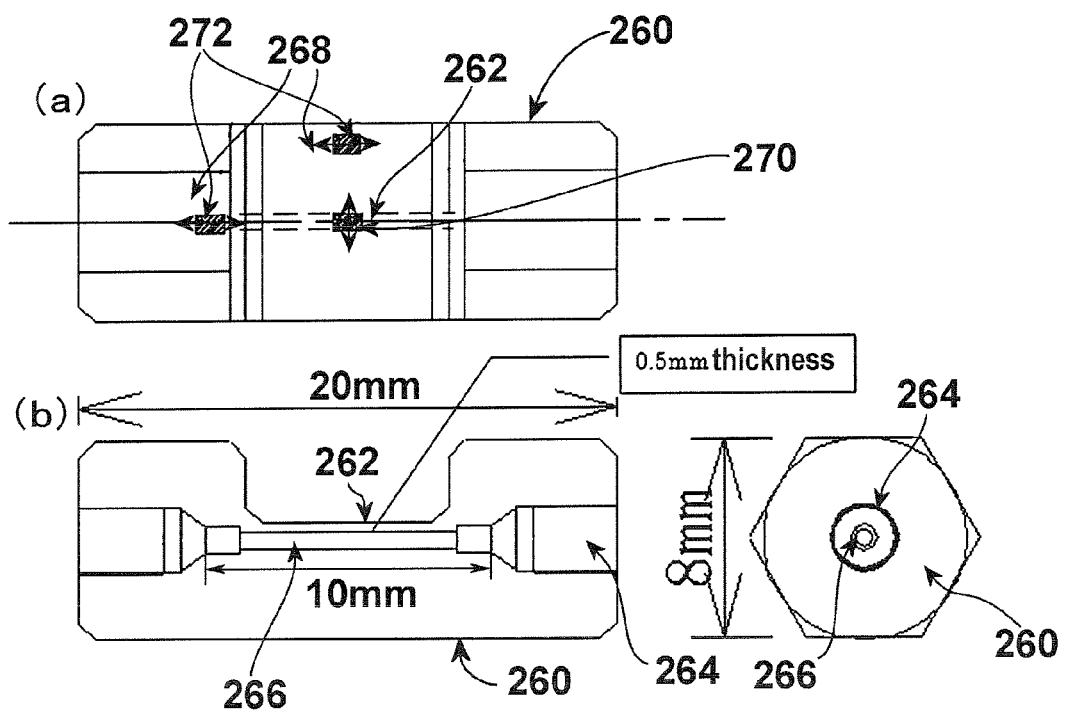
FIG. 28 illustrates the plan of the pressure gauge, side view of the pressure gauge, and the cross-sectional view of the pressure gauge 3.

As indicated in a plan of a pressure gauge according to the present invention, shown in FIG. 28(a), a hexagonal member 260 having a shape similar to a pipe joint of the pressure gauge of the present invention includes a surface 262 for attaching a strain gauge for measuring strain and surfaces 268 for attaching strain gauges for measuring the temperature. A strain gauge 270 for measuring strain is attached to the surface 262 for attaching a strain gauge for measuring strain, and strain gauges 272 for measuring temperature are attached to the surfaces 268 for attaching strain gauges for measuring temperature.

As indicated in a cross-sectional view of the pressure gauge according to the present invention, shown in FIG. 28(b), the hexagonal member 260 includes a through-hole 266 having an inside diameter of 1.0 mm, pipe connection holes 264 for connecting pipes at both sides of the through-hole 266, and the surface 262 for attaching a strain gauge for measuring strain (also shown in FIG. 28(a)), which is made by cutting the hexagonal member, by setting the distance (wall thickness) from the outside surface of the through-hole to 0.5 mm, and by polishing the surface thereof.

As indicated in the plan view of the pressure gauge according to the present invention, shown in FIG. 28(a), one strain gauge is attached at the center of the surface 262 for attaching a strain gauge for measuring strain, enclosed by dotted lines, and two strain gauges for temperature correction are attached on the surfaces 268 for attaching strain gauges for measuring temperature, on the flat surface and the outside surface of the hexagonal member. The strain gauges are used to form a bridge circuit to output a signal. Arrows on the strain gauges indicate the strain detection directions of the strain gauges.

This structure provides a strength not exceeding the elasticity limit of the material used while satisfactorily allowing detection of strain, at the portion where the strain gauges are attached, and provides a strength at the other portions high enough to substantially not be able to detect a strain (so as not to produce a strain). With this structure, a strain caused by applied pressure can be measured; strain changes corresponding to sudden pressure changes can be traced in real time with respect to the pressure; and the amounts of strain at the detection portions instantly vanish when the pressure is released, by providing the low-strength portions where the pressure can be detected, partially in the block that has sufficient strength.

Figure 29:
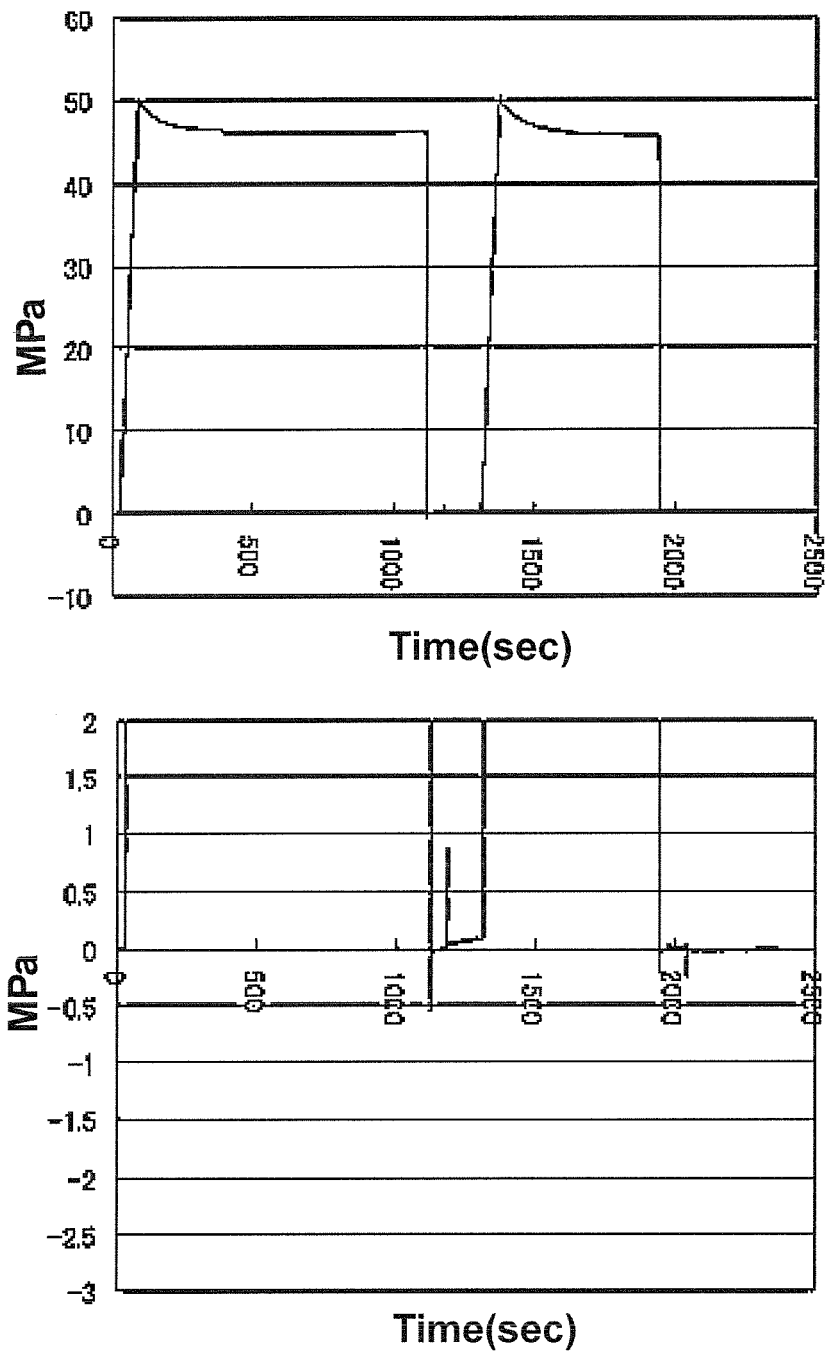
FIG. 29 illustrates the signal output changes of the pressure gauge 3 (the same pressure gauge as FIG. 28).

In FIG. 29, the horizontal axis indicates time and the vertical axis indicates signal output changes caused by pressure changes. The lower graph of FIG. 29 is an enlarged view of a part of the upper graph of FIG. 29. Compared with the pressure gauge 2 and the pressure gauge 3, the signal output obtained when the pressure is released has almost no minus shifted portion, and the measured pressure fluctuation is largely reduced while maintaining the pressure.

Solvent Exchange

Figure 30:
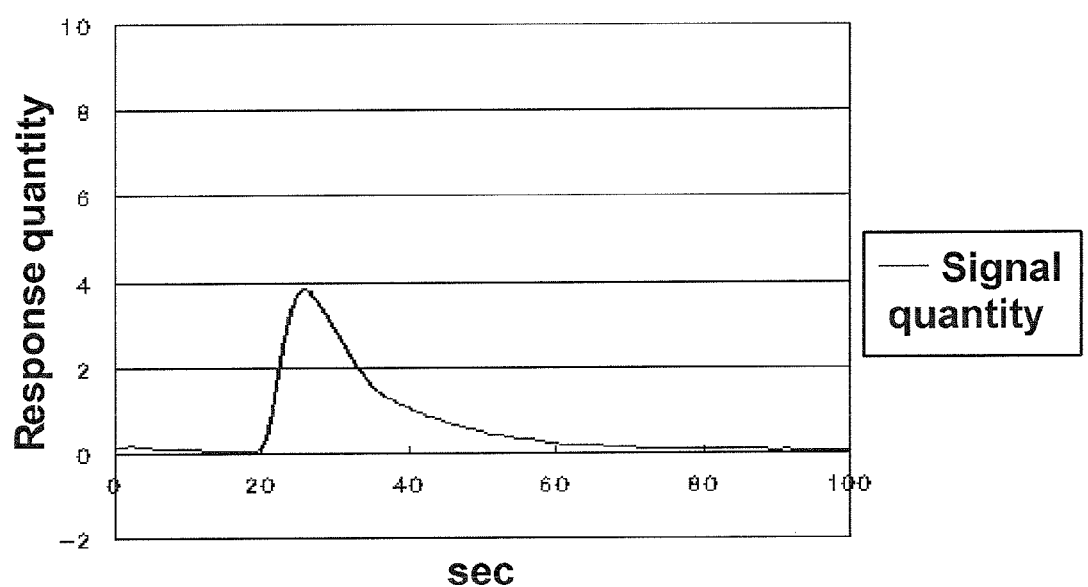
FIG. 30 illustrates changes in sample concentration within set time when the conventional flow-type diaphragm pressure gauge (hereafter called a reference pressure gauge).
Figure 31:
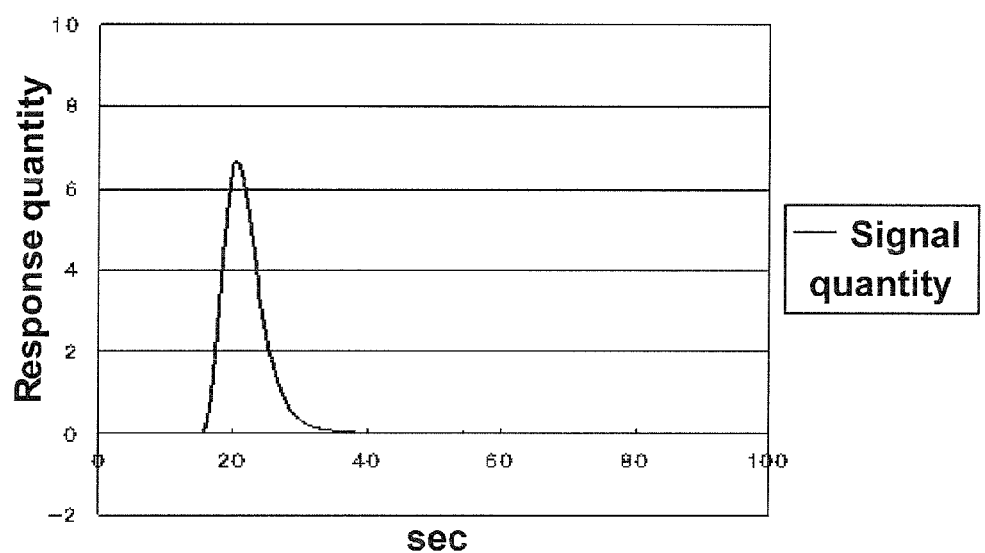
FIG. 31 illustrates changes in sample concentration within set time when the pressure gauge 3 (the same pressure gauge as FIG. 28) were used.

FIG. 30 and FIG. 31 show changes in sample concentration within set time when a conventional flow-type diaphragm pressure gauge (hereafter called a reference pressure gauge) and the pressure gauge 3 were used, respectively. The horizontal axis indicates time in seconds and the vertical axis indicates the response (concentration of the sample flowing inside). The solvent was methanol, the flow rate is 0.5 ml/min, the sample was anthracene, 10 µl of the sample was injected by an injector, and elution peak shapes were compared by detectors.

As clearly shown in the charts, the reference pressure gauge shown in FIG. 30 required about 50 seconds until the elution of the sample was completed, whereas the pressure gauge 3 shown in FIG. 31 required 15 seconds until the elution of the sample was completed. Since the pressure gauge 3 has a shorter elution time than the reference pressure gauge, the pressure gauge 3 has superior solvent exchange.

Pressure Measurement Precision

Figure 32:
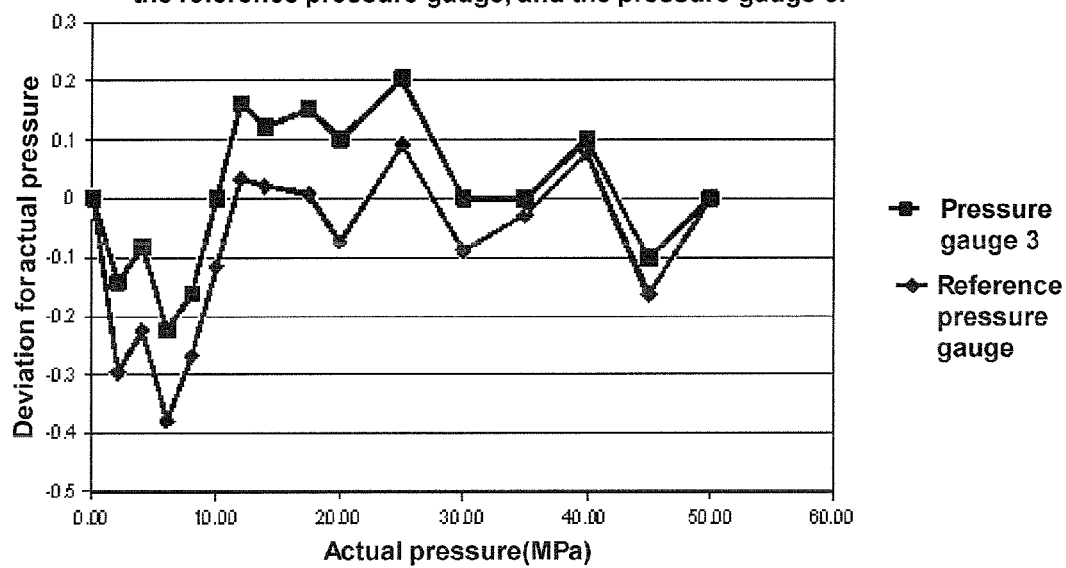
FIG. 32 illustrates variations of the pressure values measured by the reference pressure gauge and the pressure gauge 3 (the same pressure gauge as FIG. 28) with respect to the pressure values measured by a reference pressure gauge.

FIG. 32 shows variations of the pressure values measured by the reference pressure gauge and the pressure gauge 3 with respect to the pressure values measured by a standard pressure gauge. The measurement variations are within 0.35 MPa in a pressure range of 0 to 50 MPa, and it is understood that both pressure gauges have sufficient performance.

The measurement variations can be corrected by using the following expressions. It is assumed here that all the pressure gauges have linear signal outputs from 0 to 50 MPa. The signal outputs are converted to pressure values by using an expression: pressure value=a×signal output+b. If the variations are large, the coefficients a and b can be set in pressure ranges, as shown in an example case below, to increase pressure precision.

Range 1 from 0 to 10 MPa: Pressure value=a1×signal output+b1

Range 2 from 10 to 30 MPa: Pressure value=a2×signal output+b2

Range 3 from 30 to 50 MPa: Pressure value=a3×signal output+b3

A polynomial approximation may be used to make the measured pressure match the actual pressure.

Shape of Pressure Gauge

A typical shape of a pressure gauge according to the present invention is like a hexagonal pipe joint generally used in an HPLC, SFC, or SFE system. A straight flow path having an inside diameter of about 1.0 mm is made in the hexagonal block; a part of the hexagonal block is cut away to form a flat surface such that the distance to the periphery of the flow path is 0.5 mm, the surface is polished and serves as a strain-measurement strain gauge attaching surface; and a strain gauge is installed on the surface.

By doing so, the same stability, the same low drift, and the same precision as the conventional diaphragm pressure gauges are obtained.

The dimensions of the pressure gauge according to the present invention are almost the same as those of a hexagonal pipe joint generally used in an HPLC, SFC, or SFE system. The inside diameter of the flow path is 1.0 mm, and the length thereof is about 10 mm. Holes (receptacles) that can accommodate the tips of pipes, ferrules, or set screws are provided at both ends of the flow path so as to be connected to pipes having an outside diameter of 1/16" generally used in an HPLC, SFC, or SFE system.

Material of Pressure Gauge

The block can be made of a metal or a resin. In HPLC, SFC, and SFE systems, stainless steel (such as SUS 316, SUS 304, and SUS 630), titanium, or polyetheretherketone (PEEK) is used often.

What is claimed is:

1. A pressure gauge for measuring the pressure of a fluid flowing through a pipe, comprising a metallic pressure gauge body having a straight and cylindrical internal space penetrating the pressure gauge,
the pressure gauge body comprising:
a strain-measurement strain gauge attaching surface on the outside surface of the pressure gauge, at a portion having a thickness where pressure produced in the internal space when a fluid is made to flow through the internal space can be detected with a strain gauge attached, the strain-measurement strain gauge attaching surface being at a part of the outside periphery of the internal space; and
a portion having a thickness where the pressure produced in the internal space is impossible to detect even with a strain gauge attached;
the pipe being connected to a fluid inlet and outlet of the internal space and a strain-measurement strain gauge being attached to the strain-measurement strain gauge attaching surface, to measure the pressure of the fluid in the internal space.

2. A pressure gauge according to claim 1, wherein an area of the strain-measurement strain gauge attaching surface is less than 20% of an area of the whole outside surface of the pressure gauge.

3. A pressure gauge according to claim 2, further comprising a temperature-correction strain gauge attaching surface, at a portion having a thickness where pressure produced in the internal space when a fluid is made to flow through the internal space is substantially impossible to detect with a strain gauge attached and also having a thickness where a strain of a component member of the pressure gauge caused by thermal expansion due to the heat of the fluid can be detected,
wherein a temperature-correction strain gauge is attached to the temperature-correction strain gauge attaching surface to measure the strain caused by the thermal expansion of the pressure gauge to correct the pressure value.

4. A pressure gauge according to claim 2, wherein the fluid inlet and outlet of the internal space of the pressure gauge are connected to pipes of an apparatus so as to serve as a joint for joining the pipes.

5. A pump comprising a pressure gauge according to claim 2,
wherein the fluid inlet and outlet of the internal space of the pressure gauge are connected to pipes of the pump; and
the pressure of the fluid in the pressure gauge is measured.

6. A back pressure regulator comprising a pressure gauge according to claim 2,
wherein the fluid inlet and outlet of the internal space of the pressure gauge are connected to pipes of the back pressure regulator, and
the pressure of the fluid in the pressure gauge is measured to set the pressure to a desired setting.

7. A pressure gauge according to claim 1, further comprising a temperature-correction strain gauge attaching surface, at a portion having a thickness where pressure produced in the internal space when a fluid is made to flow through the internal space is substantially impossible to detect with a strain gauge attached and also having a thickness where a strain of a component member of the pressure gauge caused by thermal expansion due to the heat of the fluid can be detected,
wherein a temperature-correction strain gauge is attached to the temperature-correction strain gauge attaching surface to measure the strain caused by the thermal expansion of the pressure gauge to correct the pressure value.

8. A pressure measurement method for the pressure gauge according to claim 7, comprising the step of calculating a pressure value Y by substituting the signal output value X of the strain gauge into a linear expression Y=aX+b, where a and b are set for each predetermined pressure range, or
the step of calculating a pressure value Y by substituting the signal output value X of the strain gauge into a polynomial $Y=a_1X^{(n-1)}+a_2X^{(n-2)}+\ldots+a_nX^0$, that represents the relationship between the pressure value Y and the signal output value X in all pressure ranges, with $a_i$ (i=1 to n) specified accordingly.

9. A pressure gauge according to claim 7, wherein the fluid inlet and outlet of the internal space of the pressure gauge are connected to pipes of an apparatus so as to serve as a joint for joining the pipes.

10. A pump comprising a pressure gauge according to claim 7,
wherein the fluid inlet and outlet of the internal space of the pressure gauge are connected to pipes of the pump; and
the pressure of the fluid in the pressure gauge is measured.

11. A back pressure regulator comprising a pressure gauge according to claim 7,
wherein the fluid inlet and outlet of the internal space of the pressure gauge are connected to pipes of the back pressure regulator, and
the pressure of the fluid in the pressure gauge is measured to set the pressure to a desired setting.

12. A pressure gauge according to claim 1, wherein the fluid inlet and outlet of the internal space of the pressure gauge are connected to pipes of an apparatus so as to serve as a joint for joining the pipes.

13. A pump comprising a pressure gauge according to claim 1,
wherein the fluid inlet and outlet of the internal space of the pressure gauge are connected to pipes of the pump; and
the pressure of the fluid in the pressure gauge is measured.

14. An HPLC apparatus comprising a pump according to claim 13.

15. An SFC apparatus comprising a pump according to claim 13.

16. An SFE apparatus comprising a pump according to claim 13.

17. A back pressure regulator comprising a pressure gauge according to claim 1,
wherein the fluid inlet and outlet of the internal space of the pressure gauge are connected to pipes of the back pressure regulator, and
the pressure of the fluid in the pressure gauge is measured to set the pressure to a desired setting.

18. An SFC apparatus comprising a back pressure regulator according to claim 17.

19. An SFE apparatus comprising a back pressure regulator according to claim 17.

20. A pressure gauge according to claim 1 for measuring the pressure from 0 MPa to 100 Mpa of a fluid flowing through a pipe, comprising the pressure gauge body made of stainless steel having the straight and cylindrical internal space penetrating the pressure gauge, the pressure gauge body comprising:
the strain-measurement strain gauge attaching surface on the outside surface of the pressure gauge, at the portion having a thickness of not more than 4 mm where pressure produced in the internal space when a fluid is made to flow through the internal space can be detected with the strain gauge attached, the strain-measurement strain gauge attaching surface being at a part of the outside periphery of the internal space; and the portion having a thickness of more than 4 mm where the pressure produced in the internal space is impossible to detect even with a strain gauge attached;

the pipe being connected to a fluid inlet and outlet of the internal space and a strain-measurement strain gauge being attached to the strain-measurement strain gauge attaching surface, to measure the pressure of the fluid in the internal space.

21. A pressure gauge for measuring the pressure of a fluid flowing through a pipe, comprising a pressure gauge body made of a resin having a straight and cylindrical internal space penetrating the pressure gauge, the pressure gauge body comprising:

a strain-measurement strain gauge attaching surface on the outside surface of the pressure gauge, at a portion having a thickness where pressure produced in the internal space when a fluid is made to flow through the internal space can be detected with a strain gauge attached, the strain-measurement strain gauge attaching surface being at a part of the outside periphery of the internal space; and a portion having a thickness where the pressure produced in the internal space is impossible to detect even with a strain gauge attached;

the pipe being connected to a fluid inlet and outlet of the internal space and a strain-measurement strain gauge being attached to the strain-measurement strain gauge attaching surface, to measure the pressure of the fluid in the internal space.

* * * * *